United States Patent
Ding

(10) Patent No.: US 12,276,820 B2
(45) Date of Patent: Apr. 15, 2025

(54) ENERGY-EFFICIENT WINDOW COATINGS TRANSMISSIBLE TO WIRELESS COMMUNICATION SIGNALS AND METHODS OF FABRICATING THEREOF

(71) Applicant: LabForInvention, Fremont, CA (US)

(72) Inventor: Guowen Ding, San Jose, CA (US)

(73) Assignee: LabForInvention, Fremont, CA (US)

( * ) Notice: Subject to any disclaimer, the term of this patent is extended or adjusted under 35 U.S.C. 154(b) by 648 days.

(21) Appl. No.: 17/647,331

(22) Filed: Jan. 6, 2022

(65) Prior Publication Data
US 2022/0221636 A1     Jul. 14, 2022

Related U.S. Application Data

(60) Provisional application No. 63/182,077, filed on Apr. 30, 2021, provisional application No. 63/135,214, filed on Jan. 8, 2021.

(51) Int. Cl.
*G02B 5/20*     (2006.01)
(52) U.S. Cl.
CPC ................... *G02B 5/208* (2013.01)
(58) Field of Classification Search
CPC ............... Y10T 428/16; Y10T 428/162; Y10T 428/163; Y10T 428/164; Y10T 428/166;
(Continued)

(56) References Cited

U.S. PATENT DOCUMENTS 3,837,907 A    9/1974   Berglund et al.
5,364,685 A   11/1994   Nakashima et al.
(Continued)

FOREIGN PATENT DOCUMENTS

FI          127500 B     7/2018
JP     H06247745 A     9/1994
(Continued)

OTHER PUBLICATIONS

U.S. Appl. No. 17/198,796, Restriction Requirement mailed Nov. 22, 2021, 7 pgs.
International Application Serial No. PCT/US21/21891, Search Report and Written Opinion mailed May 20, 2021, 7 pgs.

*Primary Examiner* — Maria V Ewald
*Assistant Examiner* — Ethan A. Utt
(74) *Attorney, Agent, or Firm* — Polygon IP, LLP

(57) ABSTRACT

Provided are novel energy-efficient signal-transparent window assemblies and methods of fabricating thereof. These window assemblies are specifically configured to allow selective penetration of millimeter waves, representing current and future wireless signal spectrum. This signal penetration is provided while IR blocking properties are retained. Furthermore, the windows assemblies remain substantially transparent within the visible spectrum with no specific features detectable to the naked eye. This unique performance is achieved by patterning conductive layers such that the conductive layer edges remain protected during most fabrication steps and the fabrication. As such, the conductive layers are encapsulated and being separated from the environment while retaining separation between individual disjoined structures of these layers. For example, a barrier layer and/or a dielectric layer may extend over the conductive layer edge. The patterning is achieved by forming spacers on the substrate and depositing a stack over these photoresist structures. The spacers are removed thereafter.

20 Claims, 12 Drawing Sheets

(58) Field of Classification Search
CPC ..... Y10T 428/24802; Y10T 428/24851; Y10T 428/24868; Y10T 428/24917; Y10T 428/24926; B32B 3/00; B32B 3/10; B32B 3/14; B32B 3/18; B32B 3/22; B32B 3/26; B32B 9/00; B32B 9/005; B32B 9/04; B32B 9/041; B32B 15/00; B32B 15/04; B32B 15/043; B32B 15/20; B32B 17/00; B32B 17/06; B32B 18/00; B32B 33/00; B32B 2255/06; B32B 2255/20; B32B 2255/205; B32B 2255/28; B32B 2307/412; C03C 17/00; C03C 17/06; C03C 17/22; C03C 17/225; C03C 17/23; C03C 17/34; C03C 17/3411; C03C 17/3429; C03C 17/3435; C03C 17/36; C03C 17/3602; C03C 17/3605; C03C 17/3607; C03C 17/361; C03C 17/3613; C03C 17/3615; C03C 17/3618; C03C 17/3626; C03C 17/3639; C03C 17/3642; C03C 17/3644; C03C 17/3655; C03C 17/3657; C03C 17/366; C03C 17/3681; C03C 2217/94; C03C 2217/948; G02B 1/00; G02B 1/10; G02B 1/14; E06B 3/66
USPC ........ 428/34, 44, 46, 47, 48, 49, 195.1, 201, 428/203, 209, 210, 426, 428, 432, 433, 428/434

See application file for complete search history.

(56) References Cited

U.S. PATENT DOCUMENTS

| | | | |
|---|---|---|---|
| 6,730,389 | B2 | 5/2004 | Voeltzel |
| 8,927,069 | B1 | 1/2015 | Estinto et al. |
| 9,587,303 | B2 | 3/2017 | Palacios-Laloy |
| 2008/0008969 | A1* | 1/2008 | Zhou ................... H01L 21/0338 430/311 |
| 2011/0135880 | A1* | 6/2011 | Roman ................. C03C 17/366 204/192.12 |
| 2015/0343884 | A1* | 12/2015 | Rousselet ............... B60J 1/002 359/360 |
| 2015/0369980 | A1* | 12/2015 | Ockenfuss ........ H01L 27/14621 |
| 2016/0111297 | A1* | 4/2016 | Chen ................... H01L 21/0337 438/692 |
| 2018/0036839 | A1 | 2/2018 | Estinto et al. |
| 2018/0316365 | A1* | 11/2018 | Völkel ............... H01Q 15/0013 |
| 2021/0129495 | A1* | 5/2021 | Asai ................. B32B 17/10036 |
| 2021/0283884 | A1 | 9/2021 | Ding |

FOREIGN PATENT DOCUMENTS

| | | | |
|---|---|---|---|
| JP | 2862452 B2 | 3/1999 | |
| WO | 2013122181 A1 | 8/2013 | |
| WO | 2014033007 A1 | 3/2014 | |
| WO | 2014126135 A1 | 8/2014 | |
| WO | 2016205104 A1 | 12/2016 | |
| WO | WO-2019189042 A1 * | 10/2019 | ....... B32B 17/10036 |
| WO | 2021183756 A1 | 9/2021 | |

* cited by examiner

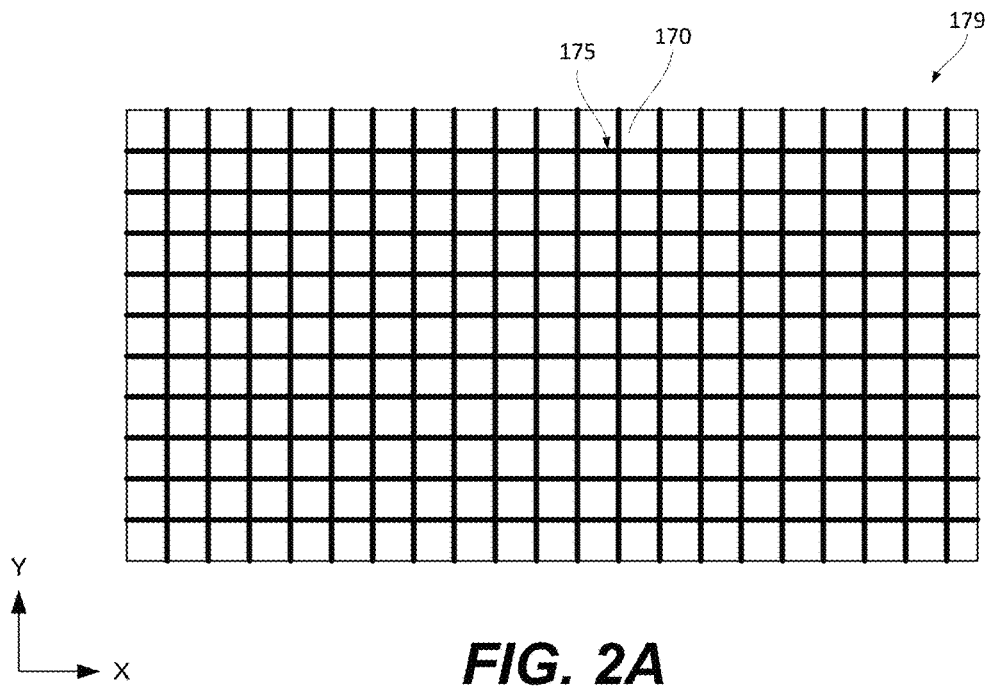
FIG. 2A
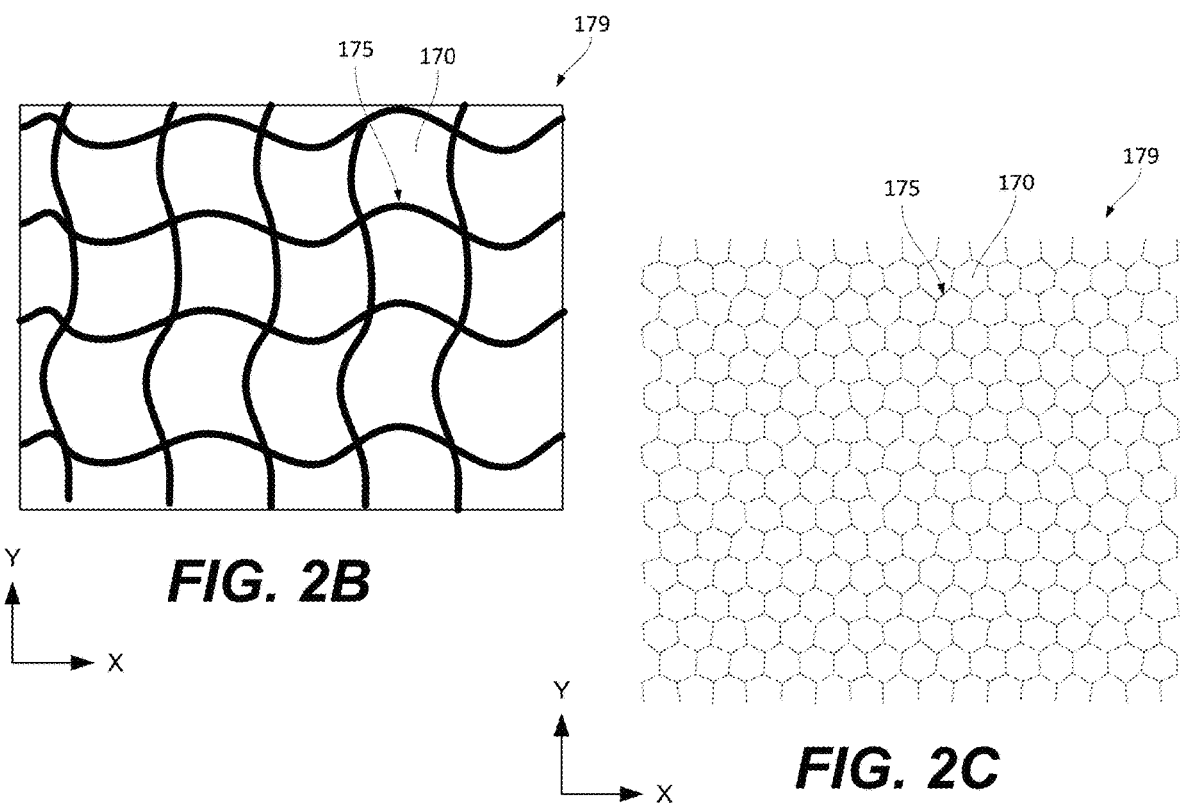
FIG. 2B
FIG. 2C

*Deposit Photoresist*

*UV Exposure*

*Develop and Clean*

ENERGY-EFFICIENT WINDOW COATINGS TRANSMISSIBLE TO WIRELESS COMMUNICATION SIGNALS AND METHODS OF FABRICATING THEREOF

CROSS-REFERENCE TO RELATED APPLICATIONS

This application claims the benefit under 35 U.S.C. § 119(e) of U.S. Provisional Patent Application 63/135,214, filed on 2021 Jan. 8, U.S. Provisional Patent Application 63/182,077, filed on 2021 Apr. 30, all of which are incorporated herein by reference in their entirety for all purposes.

BACKGROUND

Windows tend to be the least energy-efficient component in buildings. For example, radiation-based heat transfer represents about 60% of the total energy loss through standard windows. Energy-efficient windows utilize special coatings to reduce this heat transfer, e.g., by blocking the IR (infrared) radiation, corresponding to wavelengths between 5 micrometers to 50 micrometers. However, energy-efficient windows also tend to block wireless communication signals with wavelengths longer than 50 micrometers or even longer than 0.5 millimeters. This signal blocking negatively impacts cellular reception, Wi-Fi access, and the like. Conventional approaches use external antennas to rebroadcast signals inside the building. However, such systems are complex, expensive, and provide minimal coverage inside the buildings. Furthermore, covering all areas inside the building with such systems can be difficult.

SUMMARY

Provided are novel energy-efficient signal-transparent window assemblies and methods of fabricating thereof. These window assemblies are specifically configured to allow selective penetration of millimeter waves, representing current and future wireless signal spectrum. This signal penetration is provided while IR blocking properties are retained. Furthermore, the windows assemblies remain substantially transparent within the visible spectrum with no specific features detectable to the naked eye. This unique performance is achieved by patterning conductive layers such that the conductive layer edges remain protected during most fabrication steps and the fabrication. As such, the conductive layers are encapsulated and being separated from the environment while retaining separation between individual disjoined structures of these layers. For example, a barrier layer and/or a dielectric layer may extend over the conductive layer edge. The patterning is achieved by forming spacers on the substrate and depositing a stack over these photoresist structures. The spacers are removed thereafter.

In some examples, an energy-efficient signal-transparent window assembly comprises a window substrate, a first dielectric layer disposed over the window substrate, and a conductive layer disposed over the first dielectric layer such that the first dielectric layer is disposed between the conductive layer and the window substrate. The conductive layer is formed by multiple disjoined structures separated by gaps. The energy-efficient signal-transparent window assembly also comprises a barrier layer disposed over the conductive layer such that the conductive layer is disposed between the first dielectric layer and the barrier layer. The energy-efficient signal-transparent window assembly comprises a second dielectric layer disposed over the barrier layer such that the barrier layer is disposed between the second dielectric layer and the conductive layer. Each of the above-referenced layers (e.g., a first dielectric layer, a conductive layer, a barrier layer, and a second dielectric layer) can be a multilayered structure, in which different sublayers are formed from different materials. The first dielectric layer, the conductive layer, the barrier layer, and second dielectric layer form a plurality of primary stacks and a plurality of secondary stacks over at least a portion of the window substrate. The plurality of secondary stacks forms a pattern, defined by pattern lines extending between each adjacent pair of the plurality of primary stacks such that each of the pattern lines has a width smaller than 100 micrometers. Each of the plurality of primary stacks has an enclosed shape, defined by the pattern, with a dimension smaller than 10 millimeters in any direction parallel to the window substrate.

In some examples, each of the plurality of secondary stacks is spaced away or partially spaced away from the window substrate by one or more of residual spacers and air. In the same or other examples, each of the plurality of secondary stacks is spaced away from the window substrate by less than 200 nanometers. For example, on average, the plurality of secondary stacks protrudes further away from the window substrate more than the plurality of primary stacks. In some examples, each of the plurality of secondary stacks directly interfaces the window substrate.

In some examples, the first dielectric layer, the conductive layer, the barrier layer, and the second dielectric layer are disjoined among the plurality of primary stacks and the plurality of secondary stacks. In the same or other examples, the width of each stack in the plurality of secondary stacks is between 1 micrometer and 20 micrometers.

In some examples, the energy-efficient signal-transparent window assembly further comprises an additional first dielectric layer disposed over the stack, an additional conductive layer disposed over the additional first dielectric layer and formed by additional multiple disjoined structures separated by additional gaps, an additional barrier layer disposed over the additional conductive layer, and an additional second dielectric layer disposed over the additional barrier layer.

In some examples, the energy-efficient signal-transparent window assembly further comprises a protective layer disposed over the stack, comprising a transparent material with an extinction coefficient of less than 0.1 at 550 nanometers. For example, the protective layer has a conductivity of less than 1 S/M. The protective layer can be configured to bond to an additional window substrate.

In some examples, the pattern lines comprise pattern line segments, more than half of which have a curvature of more than 1 m$^{-1}$. In the same or other examples, the area of the enclosed shape of each of the plurality of primary stacks, defined by the pattern, is varied throughout the pattern such that a ratio of the area of the 25% largest ones to the 25% smallest ones is between 1.01 to 4.0. For example, the enclosed shape is a polygon or, more specifically, a hexagon.

In some examples, a method of forming an energy-efficient signal-transparent window assembly comprises forming a pattern of spacers on a window substrate and depositing a stack on the window substrate and the spacers. The stack comprises a first dielectric layer, a conductive layer, a barrier layer, and a second dielectric layer, wherein the conductive layer comprises multiple disjoined structures defined by the pattern of the spacers. The method proceeds with removing the spacers such that portions of the stack, previously positioned over the spacers, are disposed on the window substrate while maintaining the conductive layer as the multiple disjoined structures.

In some examples, the conductive layer is deposited using a high-pulsed plasma source with a power-on-cycle duration of less than 1 microsecond. In the same or other examples, the spacers have a tapered shape such that a substrate-interfacing surface of each of the spacers is smaller than a top surface, opposite of the substrate-interfacing surface. Furthermore, in some examples, the substrate-interfacing surface is narrower than the top surface by between 200 nanometers and 1500 nanometers. The spacers may have a height of less than 1500 nanometers.

These and other examples are described further below with reference to the figures.

BRIEF DESCRIPTION OF THE DRAWINGS

FIGS. 2A-2F are schematic top views of different patterns used for an energy-efficient signal-transparent window assembly, in accordance with some examples.

DETAILED DESCRIPTION

Figure 1A:
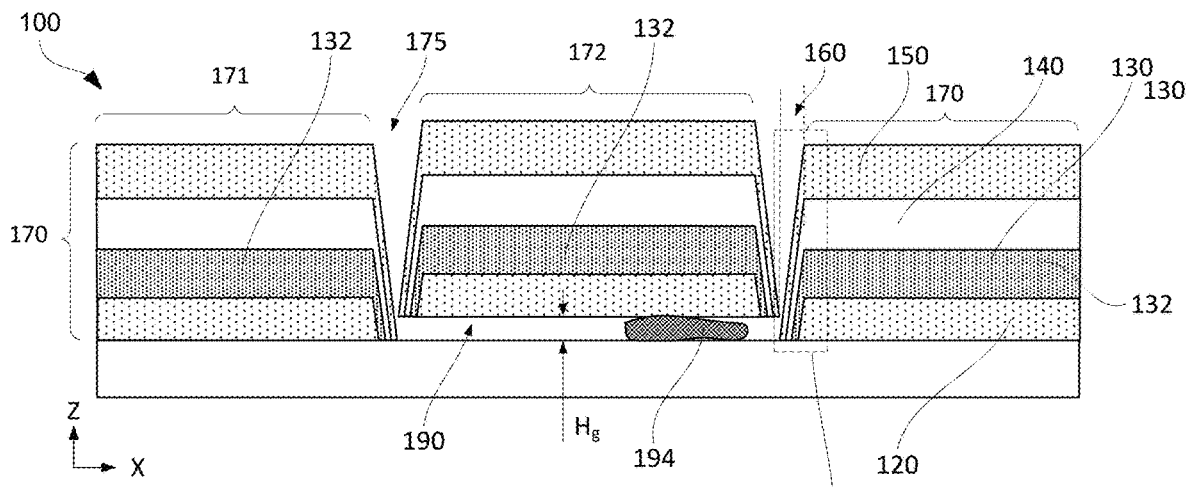
FIG. 1A is a schematic cross-sectional view of an energy-efficient signal-transparent window assembly, comprising a conductive layer formed by multiple disjoined structures, in accordance with some examples.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

Energy-efficient windows are becoming more popular in commercial and residential buildings as well as other applications. An energy-efficient window may comprise one or more silver-based layers, responsible for blocking IR radiation, in addition to various dielectric layers and barrier layers. These silver-based layers may be also referred to as metal layers or conductive layers. However, energy-efficient windows or, more specifically, silver-based layers tend to interfere with the wireless signal transmission (e.g., cellular signal) due to signal attenuation. As noted above, conventional solutions involve the installation of distributed antenna systems (DAS) within buildings to promote signal propagation. However, this approach requires special equipment, additional power consumption, and additional cost.

It has been found that using separating a conductive layer into multiple disjoined structures helps to reduce signal attenuation. It should be noted that the wavelength of electromagnetic waves, which can pass through this patterned conductive layer, depends on the opening size between the disjoined structures. More specifically, the wavelength depends on the opening width between pairs of the adjacent disjoined structures, e.g., the largest opening width is smaller than the wavelength. For example, a continuous conductive layer may be formed over the substrate and subsequently patterned, e.g., removing small portions of this conductive layer and forming top-to-bottom/through openings (e.g., extending to the substrate). However, the patterning process and subsequent exposure of conductive layer edges (within the openings) cause various durability issues with these silver-based conductive layers as well as aesthetics issues (e.g., unsightly visible line marks). As a result, patterning methods have not been widely adopted. Furthermore, patterning becomes very challenging when dealing with the $5^{th}$ generation (5G) networks using wavelengths greater than 1 millimeter. Such wavelengths require openings smaller than 0.1 millimeters in width to achieve adequate signal transmission. Future generation networks are expected to use even shorter wavelength requires smaller openings, which may be challenging to achieve with conventional laser scribing techniques.

Described herein are various examples of energy-efficient signal-transparent window assemblies and methods of fabricating thereof. These assemblies are transparent in the visible light region, allowing penetration of the electromagnetic waves at set wavelengths (e.g., carrying wireless communication signals), and are configured to block the IR radiation. For example, the transparency in the visible light region (e.g., wavelength 380-780 nanometers) may be between 10% and 100% transmission. In the same or other examples, the energy-efficient signal-transparent window assemblies allow penetration of the electromagnetic waves having a wavelength of 12.5 centimeters (corresponding to 2.4 GHz frequency) at only around 5 dB extra loss than that of an uncoated window substrate. Furthermore, the IR-blocking/emissivity is less than 0.15 in some examples. This value indicates that more than 85% of spectra between wavelength 5 micrometers to 50 micrometers are blocked by an energy-efficient signal-transparent window assembly. For comparison, conventional low-E windows (e.g., a sample from AGC Glass North America Alpharetta, GA) were reported around 30 DB signal loss measured from 1 GHz to 5 GHz.

Furthermore, the energy-efficient signal-transparent window assemblies described herein do not have unsightly visible marks and have a pleasant aesthetic appearance, unlike laser-patterned low-E windows. For example, when a window assembly is inspected at an angle of 90° to its surface with a uniform backlight simulating daylight (e.g., light intensity 10,000 lux or above), no visible marks can be observed without magnification (i.e., not observable with the "naked eye"). Furthermore, a digital photo, with a pixel density of 150,000 pixels per centimeter-square also does not show any visible marks.

The energy-efficient signal-transparent window assemblies described herein also have long-term durability. For example, an accelerated durability test, which involves dipping a sample into boiling water for one hour, does not reveal any visible marks with the inspection criteria presented above (e.g., the "naked eye" inspection and digital photo). Furthermore, no additional defects, which are attributable to this accelerated durability test, were detected under the microscope. Another accelerated durability was performed by baking a sample in a 650° C. oven for 8 minutes. Likewise, the microscope inspection did not reveal any additional defects.

Finally, the energy-efficient signal-transparent window assemblies allow wireless signal propagation of 5G signals (frequency of 6 GHz corresponding to 50-millimeter wavelength) and other like signals (e.g., future generation using higher frequencies and smaller wavelengths). In some examples, the opening width is 0.1 millimeters or even less, which much smaller than the wavelength of these communication technologies.

Examples of Energy-Efficient Signal-Transparent Window Assemblies

FIG. 1A illustrates one example of energy-efficient signal-transparent window assembly 100, comprising window substrate 110, first dielectric layer 120, conductive layer 130, barrier layer 140, and second dielectric layer 150. First dielectric layer 120, conductive layer 130, barrier layer 140, and second dielectric layer 150 can form stacks 170, which may also be referred to as a low-E stack. In some examples, stacks 170 comprise primary stacks 171 and secondary stack 172, separated from each other by stack gaps 175. These stack gaps 175 or, more specifically, secondary stack 172 form pattern 179, various examples of which are further described below with reference to FIGS. 2A-2G. More specifically, secondary stacks 172 form pattern 179, defined by pattern lines extending between each adjacent pair of primary stacks 171.

For example, pattern 179 can be such that each of primary stacks 171 has an enclosed shape to ensure the electrical separation between primary stacks 171 or, more specifically, between conductive layers 130 in these primary stacks 171 to enhance the permeability of energy-efficient signal-transparent window assembly 100 to wireless communication signals. In more specific examples, the dimension in each enclosed shape is less than 10 millimeters in any direction parallel to window substrate 110, again to enhance the permeability of energy-efficient signal-transparent window assembly 100. At the same time, secondary stacks 172 form pattern lines of pattern 179. These pattern lines extend between each adjacent pairs of primary stacks 171 and have a width of less than 100 micrometers to ensure that these pattern lines are not visible on energy-efficient signal-transparent window assembly 100. In other words, when a person casually looks at energy-efficient signal-transparent window assembly 100, energy-efficient signal-transparent window assembly 100 appears (to the "naked eye") as a homogeneous structure without any patterns.

While primary stacks 171 and secondary stack 172 may have the same structure and composition of individual components, primary stacks 171 and secondary stack 172 are formed in a different manner. Specifically, primary stacks 171 are formed right away on window substrate 110, while secondary stack 172 are formed over spacers, which are removed thereby causing secondary stack 172 to be positioned on window substrate 110. Additional details of forming primary stacks 171 and secondary stack 172 are described below with reference to FIG. 3.

Referring to FIG. 1A, in some examples, each primary stack 171 directly interfaces window substrate 110. As noted above, primary stacks 171 are formed right away on window substrate 110. Secondary stacks 172 can also directly interface window substrate 110 or be spaced away from window substrate 110. In general, at least some of secondary stacks 172 are spaced away from window substrate 110 by less than 200 nanometers or, more specifically, less than 100 nanometers or even less than 30 nanometers. In some examples, at least some of secondary stacks 172 are spaced away from window substrate 110 by gap 190, which may include one or more of residual spacers 194 and air. In some examples, gap 190 is free from any solid residual component and is filled with air. In other words, the gap is filled by only air. In the same or other examples, at least some of secondary stacks 172 is partially spaced away from window substrate 110. For example, a portion (e.g., a corner) of secondary stack 172 can directly interface window substrate 110 while another portion of the same secondary stack 172 is positioned away from window substrate 110.

In some examples, primary stacks 171 are wider than secondary stacks 172. One having ordinary skills would understand how a width can be defined for irregular shapes. For example, the largest dimension of a shape can be defined as a length. Width is defined as the largest dimension that is perpendicular to the length. It should be noted that both length and width are measured within a plane parallel to the surface of window substrate 110. As noted below, the width of secondary stacks 172 is determined by spacers, used to create a pattern. The width of these spacers can be selected to ensure signal transmission through energy-efficient signal-transparent window assembly 100. Additional width aspects are described below with reference to FIG. 1E.

Referring to FIG. 1A, in some examples, on average, secondary stacks 172 protrude further away from window substrate 110 more than primary stacks 171. In these examples, primary stacks 171 can directly interface window substrate 110 while secondary stacks 172 can be spaced away or at least partially spaced away from window substrate 110. Alternatively, both primary stacks 171 and secondary stacks 172 are spaced away or at least partially spaced away from window substrate 110.

First dielectric layer 120 is disposed over window substrate 110. In some examples, first dielectric layer 120 may comprise multiple disjoined portions that belong to different stacks 170, e.g., as schematically shown in FIG. 1A. Conductive layer 130 is disposed over first dielectric layer 120 such that first dielectric layer 120 is positioned between conductive layer 130 and each of window substrate 110. Conductive layer 130 is formed by multiple disjoined structures 132, defined by gap pattern 179. It should be noted that multiple disjoined structures 132 allow transmission of electromagnetic waves through energy-efficient signal-transparent window assembly 100 as noted above. Barrier layer 140 is disposed over conductive layer 130 such that conductive layer 130 is disposed between first dielectric layer 120 and barrier layer 140. Similar to first dielectric layer 120 and conductive layer 130, in some examples, barrier layer 140 comprises disjoined portions. Finally, second dielectric layer 150 is disposed over barrier layer 140 such that barrier layer 140 is positioned between second dielectric layer 150 and conductive layer 130. Similar to other components of energy-efficient signal-transparent window assembly 100, second dielectric layer 150 comprises disjoined portions.

The composition and other structural features of each component will now be described in more detail. In some examples, window substrate 110 comprises glass, plastics, or any materials that can support at least first dielectric layer 120, conductive layer 130, barrier layer 140, and second dielectric layer 150. In some examples, window substrate 110 is transparent.

In some examples, first dielectric layer 120 and second dielectric layer 150 are formed from the same material. Alternatively, first dielectric layer 120 and second dielectric layer 150 are formed from different materials. In general, materials suitable for first dielectric layer 120 and second dielectric layer 150 include, but are not limited to, transparent dielectric materials such as a zinc-tin oxide ($Zn_xSn_yO_z$) and a silicon nitride ($Si_3N_4$). In some examples, the dielectric conductivity of the material forming first dielectric layer 120 and/or second dielectric layer 150 is smaller than 1000 S/M (Siemens per meter) or, more specifically, smaller than 1 S/M. In some examples, the extinction coefficient is less than 0.1 at 550 nm. These materials may be selected for color tuning, e.g., to make the boundary of the discontinuous layer invisible. Additional color tuning may be achieved by controlling the thickness of first dielectric layer 120 and second dielectric layer 150. For example, first dielectric layer 120 and/or second dielectric layer 150 may have a thickness of 10 nm to 100 nm. In some examples, first dielectric layer 120 and/or second dielectric layer 150 allows for vacuum break during fabrication of energy-efficient signal-transparent window assembly 100.

In some examples, each of first dielectric layer 120 and second dielectric layer 150 is formed entirely from the same material (e.g., having the same composition through the entire volume of the layer). Alternatively, one or both first dielectric layer 120 and second dielectric layer 150 are multilayered structures. At least one layer in these multilayered structures is formed using a dielectric material.

In some examples, conductive layer 130 is configured to provide IR-blocking for energy saving while allowing penetration of signal-carrying electromagnetic waves. Some examples of materials suitable for conductive layer 130 include, but are not limited to, silver, silver alloys, copper, gold, ITO (indium tin oxide), and the like. In some examples, the sheet resistance of conductive layer 130 is smaller than 100 Ohm/square. In some examples, the thickness of conductive layer 130 is between 5 nanometers and 40 nanometers.

In some examples, conductive layer 130 is patterned or, more specifically, formed by multiple disjoined structures 132. The size of these multiple disjoined structures 132 and spacing between two adjacent ones of multiple disjoined structures 132 are set by pattern 175. The size of these disjoined structures 132 depends on the stack type as e.g., schematically shown in FIG. 1E. For example, disjoined structures 132 in primary stacks 171 may have a width ($W_1$) between about 0.05 millimeters and 5 millimeters or, more specifically, between about 0.1 millimeters and 2 millimeters. In the same or other examples, disjoined structures 132 in secondary stacks 172 may have a width ($W_2$) between about 0.1 micrometers and 20 micrometers or, more specifically, between about 1 micrometer and 8 micrometers. These parameters define the transmissibility of energy-efficient signal-transparent window assembly 100 to signal-carrying electromagnetic waves.

In some examples, barrier layer 140 is used to protect conductive layer 130 from the environment and degradation (e.g., to protect silver in conductive layer 130 from oxidation). The materials suitable for barrier layer 140 include, but are not limited to metals or metal oxides, such as NiCr, $NiCrO_x$, $TiO_x$, NiTiNb, $NiTiNbO_x$. In some examples, the thickness of barrier layer 140 is between about 1 nanometers and 15 nanometers or, more specifically, between 2 nanometers and 10 nanometers. It should be noted that all thicknesses values defined above refer to the planar portions of these components and away from stack gaps 175.

Figure 1B:
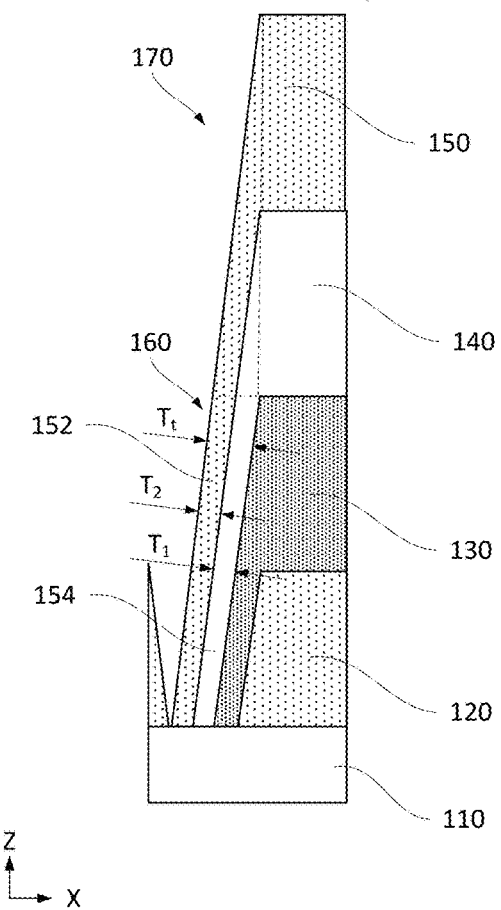
FIG. 1B is a schematic expanded view of a portion of the energy-efficient signal-transparent window assembly in FIG. 1A.

Referring to FIGS. 1A and 1B, in some examples, stacks 170 comprise sidewalls 160 at least one of barrier layer 140 and second dielectric layer 150. Sidewalls 160 can be formed in-situ while depositing barrier layer 140 and second dielectric layer 150. In some examples, each of two adjacent sidewalls 160 is formed by both barrier layer 140 and second dielectric layer 150. Sidewalls 160 protect conductive layer 130 from the environment, e.g., when stacks gaps 175 have openings extending below the level of second dielectric layer 150. It should be noted that in some examples, stacks gaps 175 are at least partially filled or even fully filled. In some examples, sidewalls 160 extend to window substrate 110.

Specifically, sidewalls 160 are formed by specifically tuning the deposition processes of conductive layer 130, barrier layer 140, and second dielectric layer 150. In some examples, the total sidewall thickness (identified as $T_t$ in FIG. 1B) is between 2 nanometers and 100 nanometers or, more specifically, between 2 nanometers and 20 nanometers. In the same or other examples, the contribution of barrier layer 140 to the total sidewall thickness (identified as $T_1$ in FIG. 1B) is between about 0.1 nanometers and 2 nanometers or, more specifically, between 0.2 nanometers and 1 nanometer. Alternatively, barrier layer 140 is not a part of sidewalls 160. In the same or other examples, the contribution of second dielectric layer 150 to the total sidewall thickness (identified as $T_2$ in FIG. 1B) is between about 2 nanometer and 100 nanometers or, more specifically, between 2 nanometers and 15 nanometers. Alternatively, second dielectric layer 150 is not a part of sidewalls 160. It should be noted that the thickness of sidewall-forming portions of barrier layer 140 and/or second dielectric layer 150 can be different (e.g., smaller) than the corresponding thickness of barrier layer 140 and/or second dielectric layer 150 away from sidewalls 160 due to the deposition angle.

Figure 1C:
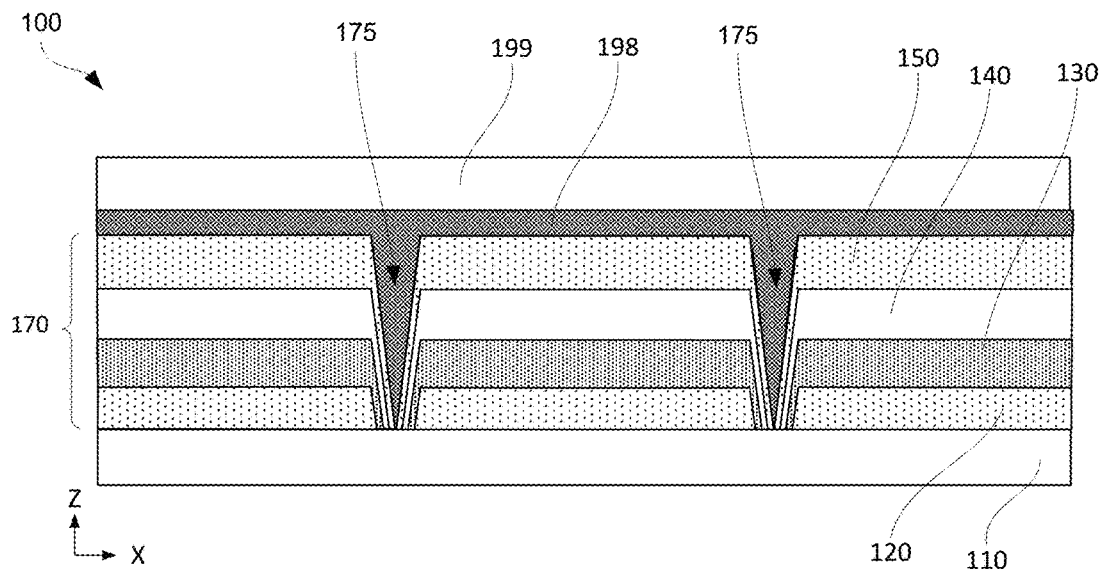
FIG. 1C is a schematic cross-sectional view of another example of the energy-efficient signal-transparent window assembly, comprising a protective layer.

FIG. 1C illustrates another example of energy-efficient signal-transparent window assembly 100, which comprises protective layer 198. In this example, protective layer 198 conforms to the entire surface of second dielectric layer 150, and over both primary stacks 171 and secondary stacks 172, thereby forming an entire surface (on one side) of energy-efficient signal-transparent window assembly 100. Specifically, protective layer 198 extends over all stacks 171 and over stack gaps 175. By extending over stack gaps 175, protective layer 198 also forms adjacent sidewalls 160. In some examples, protective layer 198 is the only component forming sidewalls 160. Alternatively, sidewalls 160 are formed by protective layer 198 and one or both of barrier layer 140 and second dielectric layer 150. The thickness of protective layer 198 may be from 10 nanometers to 100 micrometers (or higher). In some examples, protective layer 198 comprises a transparent material with an extinction coefficient of less than 0.1 at 550 nanometers. In the same or other examples, protective layer 198 has a conductivity of less than 1 S/M.

In some examples, protective layer 198 can be used for bonding to additional glass substrate 199, e.g., as schematically shown in FIG. 1C. Protective layer 198 can be formed, e.g., from polyvinyl butyral (PVB), thermoplastic polyurethane (TPU), and/or ethylene-vinyl acetate (cross-linked EVA), to form a laminated glass assembly.

In some examples, energy-efficient signal-transparent window assembly 100 is placed into an insulated glass unit (IGU) window, which features multiple panes of glass, separated by an inert gas or vacuum, widely used in buildings. For example, protective layer 198 is configured to bond to an additional window substrate.

Figure 1D:
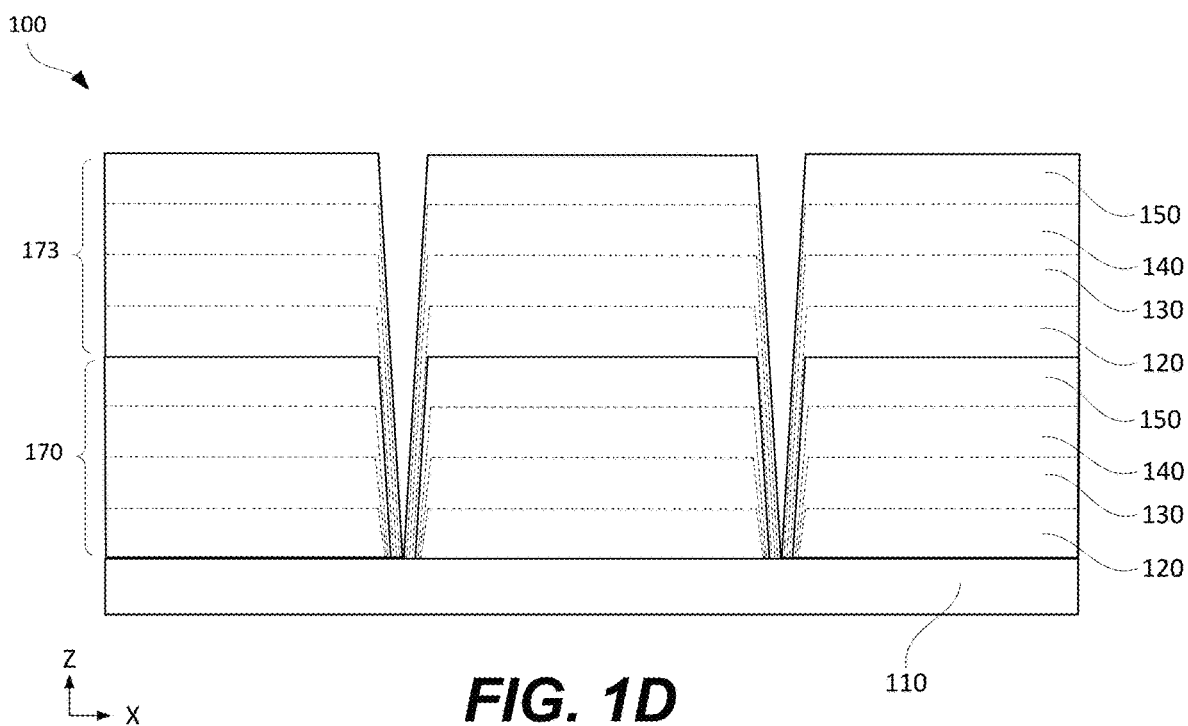
FIG. 1D is a schematic cross-sectional view of an energy-efficient signal-transparent window assembly with multiple low-E stacks formed on top of each other, in accordance with some examples.

Referring to FIG. 1D, in some examples, energy-efficient signal-transparent window assembly 100 comprises multiple low-E stacks, formed on the top of each other, such as stacks 170 and additional stacks 173, disposed over stacks 170. Each low-E stack comprises first dielectric layer 120, conductive layer 130, barrier layer 140, and second dielectric layer 150. In some examples, one or more characteristics (e.g., composition, thickness, morphology) of at least one of first dielectric layer 120, conductive layer 130, barrier layer 140, and second dielectric layer 150 can be different in different low-E stacks. Stacks 170 and additional stacks 173 can have the same dimensions or, more specifically, the footprints of stacks 170 and additional stacks 173 can coincide. Similar to stacks 170, additional stacks 173 can also include primary stacks 171 and secondary stacks 172. While FIG. 1D illustrates an example with two low-E stacks in the Z direction, one having ordinary skill in the art would understand that any number of low-E stacks can be arranged in this manner (e.g., three, four, five, or more).

Figure 1E:
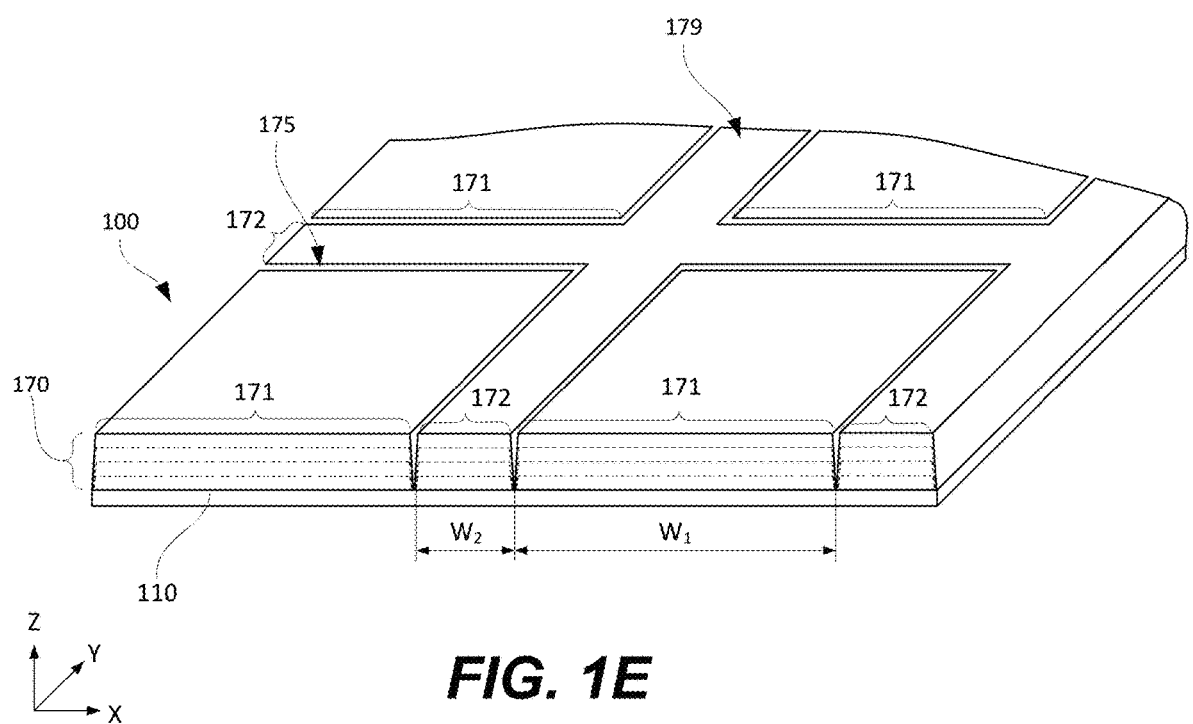
FIG. 1E is a perspective view of an energy-efficient signal-transparent window assembly, illustrating a pattern, formed by gaps between the multiple disjoined structures, in accordance with some examples.

FIG. 1E illustrates a perspective view of energy-efficient signal-transparent window assembly 100 showing different types of stacks, e.g., primary stacks 171 and secondary stacks 172. Secondary stacks 172 form pattern 179. In this example, the pattern is a rectangular grid, which is also schematically shown in FIG. 2A. In this example, two sets of parallel lines crossed each other, extending at a 90° angle relative to each other. Other angle values are also within the scope. FIGS. 2B-2F illustrate other examples of pattern 179.

Although straight parallel pattern lines are not visible in many cases, certain conditions (e.g., sunshine or spotlight) can generate a diffraction pattern, in part caused by the light reflection at various edges and surfaces formed by pattern 179 in energy-efficient signal-transparent window assembly 100. More specifically, straight parallel pattern lines cause the amplification of diffraction. Diffraction is typically caused by periodic structures, such as a diffraction grating, that splits and diffracts light into several beams traveling in different directions. Such diffraction should be avoided for aesthetic and other reasons in low-E glass applications. In general, pattern 179 shown in FIGS. 2G-2F is expected to produce less visible lines than pattern shown in FIG. 2A.

The diffraction can be reduced by using different types of pattern 179 that limit the periodic structure in the pattern design, more specifically, limit the length of straight-line portions and/or limit the level of parallelism among the pattern lines. In other words, these patterns 179 are specifically selected to have fewer and/or smaller periodic structures that do not amplify the diffraction effects as much as, e.g., a set of parallel lines. For example, any 1-square centimeter surface area of patterned energy-efficient signal-transparent window assembly 100 may contain 100 or fewer periodic structures, e.g. parallel straight lines, or even 2 or fewer periodic structures, e.g. parallel straight-line segments. For purposes of this disclosure, a straight line is defined as a line with (1) a connection line between two intersection points in pattern 179 and (2) a curvature (the reciprocal of the curvature radius) of less than 1 $m^{-1}$. Also, for purposes of this disclosure, the term "parallel" is defined as having an angle between two lines of less than 0.1 degrees.

In some examples, pattern 179, which is formed by secondary structures 172, comprises enclosed shapes of primary structure 171. These enclosed shapes can be repeated shapes (e.g., polygons) and/or random shapes. For example, pattern 179 may be formed by different kinds of shapes. In some examples, each enclosed shape of the primary stacks 171 has a dimension of less than 10 millimeters in any direction parallel to window substrate 110 or, more specifically, less than 5 millimeters or even less than 2 millimeters. As noted above, this enclosed shape dimension is used to enhance the permeability of energy-efficient signal-transparent window assembly 100 to wireless communication signals. In some examples, the enclosed shape area can be varied with a distribution from small to large area, and the area ratio of the largest 25% shapes relative to the smallest 25% shapes is between 1.01 to 4.0.

Figure 2D:
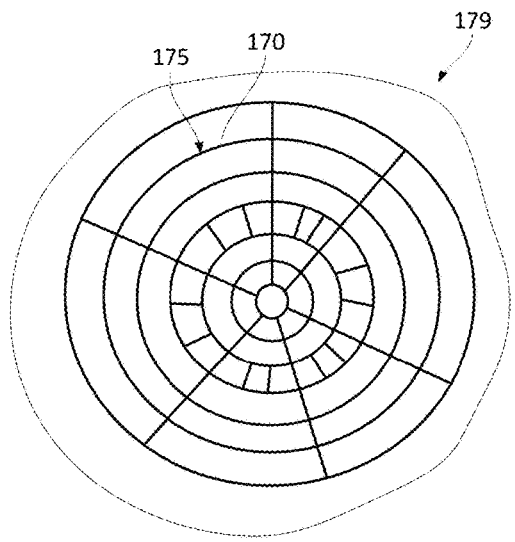
Figure 2E:
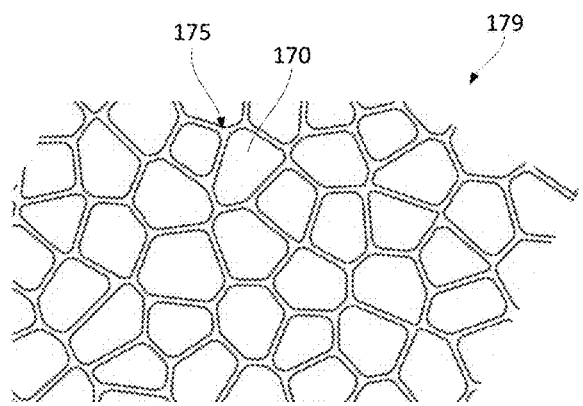
Figure 2F:
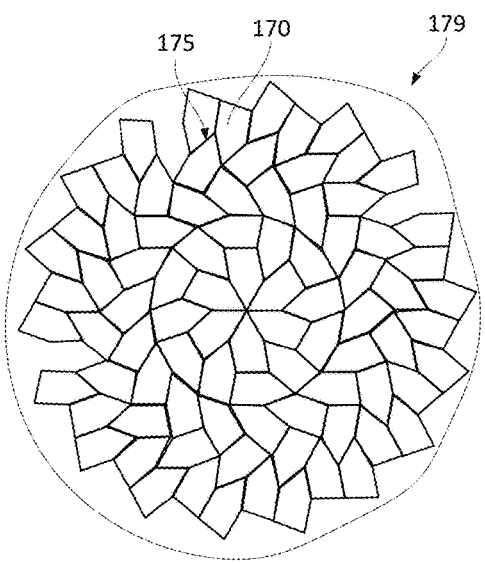
Figure 2G:
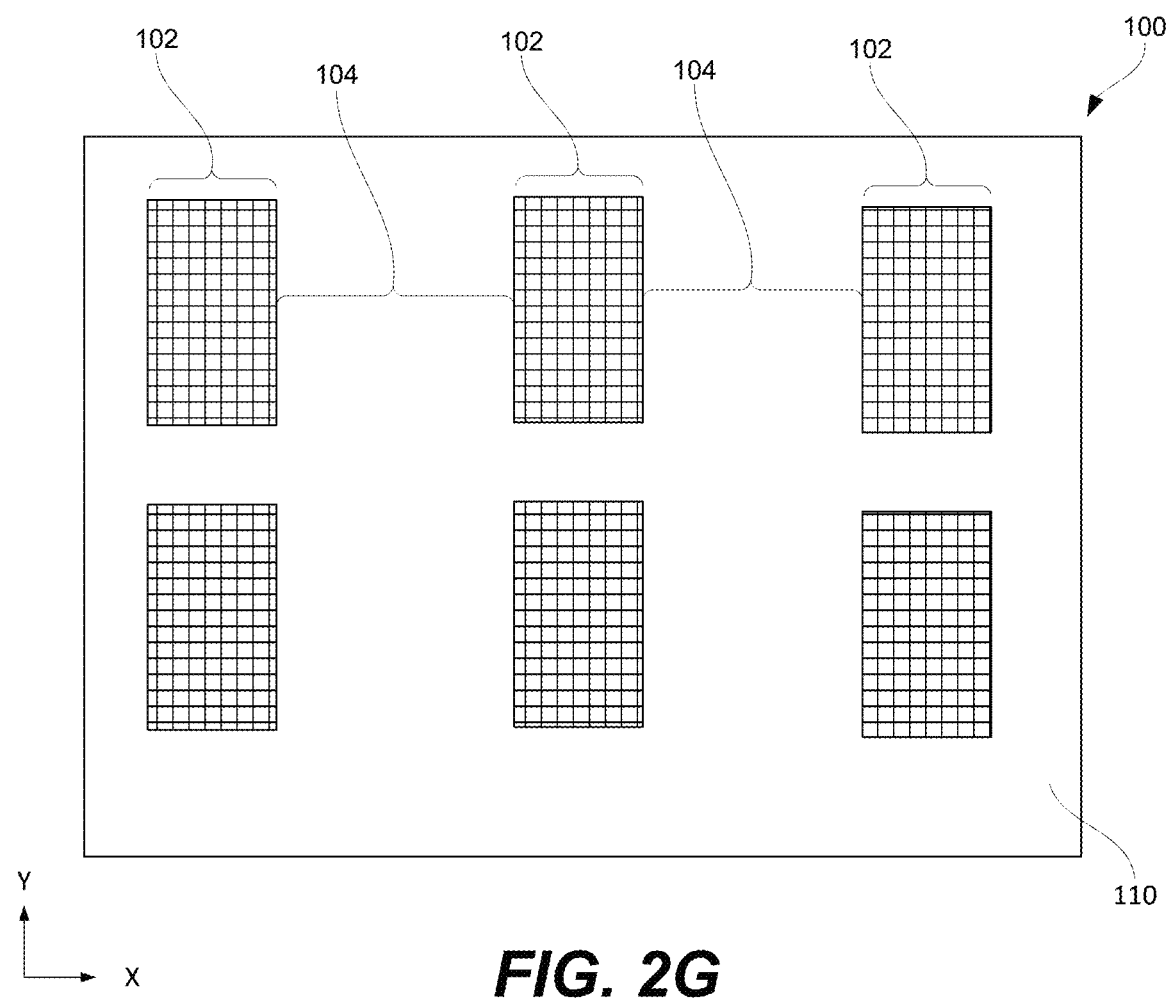
FIG. 2G is a schematic top view of an energy-efficient signal-transparent window assembly, showing patterned portions and non-patterned portions.

Referring to FIG. 2B, in some examples, pattern 179 is formed by a pattern line, more than half of which comprise pattern line segments with a curvature of more than 1 $m^{-1}$. A pattern line segment is defined as a portion of the pattern line that extends between two intersection points in pattern 179. In other words, pattern 179 is formed by lines that are not straight. These lines may be referred to as curved lines. These lines may be continuous, e.g., extending to edges of energy-efficient signal-transparent window assembly 100. In the same or other examples, pattern lines comprise segments, which form various enclosed shapes, neighboring each other as, e.g., is shown in FIGS. 2C-2E. An enclosed shape can be a polygon with straight edges or an irregular shape with one or more curved edges (with or without straight edges). The curvature of these curved edges is greater than 1 $m^{-1}$. In some examples, pattern 179 is random/non-repetitive and/or formed by irregular shapes, which helps to minimize optical artifacts that are common with repetitive patterns and/or parallel lines. The Voronoi pattern is an example of a suitable pattern for this application.

In some examples, stack 171 is formed by enclosed shapes, such as an equilateral hexagon. Because stack 171 is enclosed, a portion/island of the stack, defined by this shape, is physically and electrically isolated from adjacent stacks. More specifically, there is no electrical contact between the conductive layer portions in the stacks of two adjacent portions/islands, which helps with the transmission of signal-carrying electromagnetic waves.

In some examples, stack 171 is formed by polygons with variable-length edges (e.g., hexagons) that have length variations to achieve pattern variations as, e.g., is schematically shown in FIG. 2C. For example, each edge length among all the pattern lines may vary by between −5% and 5% or even between −30% and 30% to the average edge length. Furthermore, this variation may be random, e.g., any variation randomly between −5% and 5% or even between −30% and 30%. This random length variation reduces the detectability of the diffraction phenomenon, which is described above.

Regardless of the shape of these pattern units, in some examples, the ratio between the square root of the unit area over the unit perimeter (i.e., the SqRt-of-Area-over-Perimeter ratio) is maximized. In some examples, this SqRt-of-Area-over-Perimeter ratio is greater than 0.1, or more specifically, greater than 0.2, or even greater than 0.24. The reason for maximizing this SqRt-of-Area-over-Perimeter ratio is as follows. The overall length of the pattern line (for each unit) is defined by the perimeter. Multiplying the perimeter by the line width provides the pattern line area. The proportion of this pattern line area to the enclosed unit area should be as small as possible, such as less than 10% or even less than 1% to ensure low-E properties. The smaller pattern line area translates into aesthetic improvements. Furthermore, large pattern line areas cause the emissivity of the overall low-E coating to increase. Thus, large SqRt-of-Area-over-Perimeter ratios allow for wider pattern lines. Increasing the width of the pattern lines simplifies the manufacturing process and reduces the cost. The most effective geometric shape is a hexagon with an SqRt-of-Area-over-Perimeter ratio of 0.268. However, other polygon shapes are also within the scope, e.g., a square has an SqRt-of-Area-over-Perimeter ratio of 0.25. Overall, the equilateral polygons (e.g., square, pentagon, hexagon, heptagon, octagon, and so on) are beneficial from the SqRt-of-Area-over-Perimeter ratio perspective. It should be noted that the SqRt-of-Area-over-Perimeter ratio maximization is coupled with the random edge length variation (described above) to achieve the best aesthetic performance. As such, in some examples, pattern 179 comprises hexagonal units with the edge length variation randomly between −5% and 5% of the original equilateral hexagon edge length, further with the edge length variation randomly between −30% and 30% of the original equilateral hexagon edge length.

In some examples, the angle between two intersecting pattern lines is controlled, e.g., a lower limit is set. Small angles may pose a challenge for deposition step coverage, which may result in defects. In some examples, the angle between two intersecting patterns is at least about 30 degrees or even at least about 60 degrees or even at least 80 degrees or even at least 100 degrees. Thus, a cross-pattern pattern or polygon with more edges (e.g., hexagon) may be used such as shown in FIG. 2C. For example, using a hexagon as a unit pattern allows having an angle of about 120 degrees. It should be noted that angles will vary within each unit and among different units due to the random edge length variation.

In some examples, the distance between any pair of adjacent points (where each point is formed by two or more intersecting lines) among more than 90% enclosed units is less than 2 millimeters or, more specifically, less than 0.7 millimeters or even less than 0.2 millimeters. This distance helps to maximize the wireless signal transmission at frequencies of 5 GHz and above. As the wavelength becomes smaller, the transmission of these wavelengths requires smaller structures.

In some examples, the pattern line width is less than 10 micrometers or, more specifically, less than 5 micrometers, or even less than 2 micrometers. The smaller line width improves the aesthetics and the proportion of this pattern line area to the enclosed unit area for better maintaining the Low-E properties.

Referring to FIG. 2G, it should be noted that energy-efficient signal-transparent window assembly 100 does not need to be covered entirely by patterned low-E coating 102 and some areas of energy-efficient signal-transparent window assembly 100 may have un-patterned low-E coating 104. In this example, energy-efficient signal-transparent window assembly 100 is still able to transmit signal-carrying electromagnetic waves through patterned low-E coating 102, while un-patterned low-E coating 104 may only block partial of these electromagnetic waves.

Processing Examples

Figure 3:
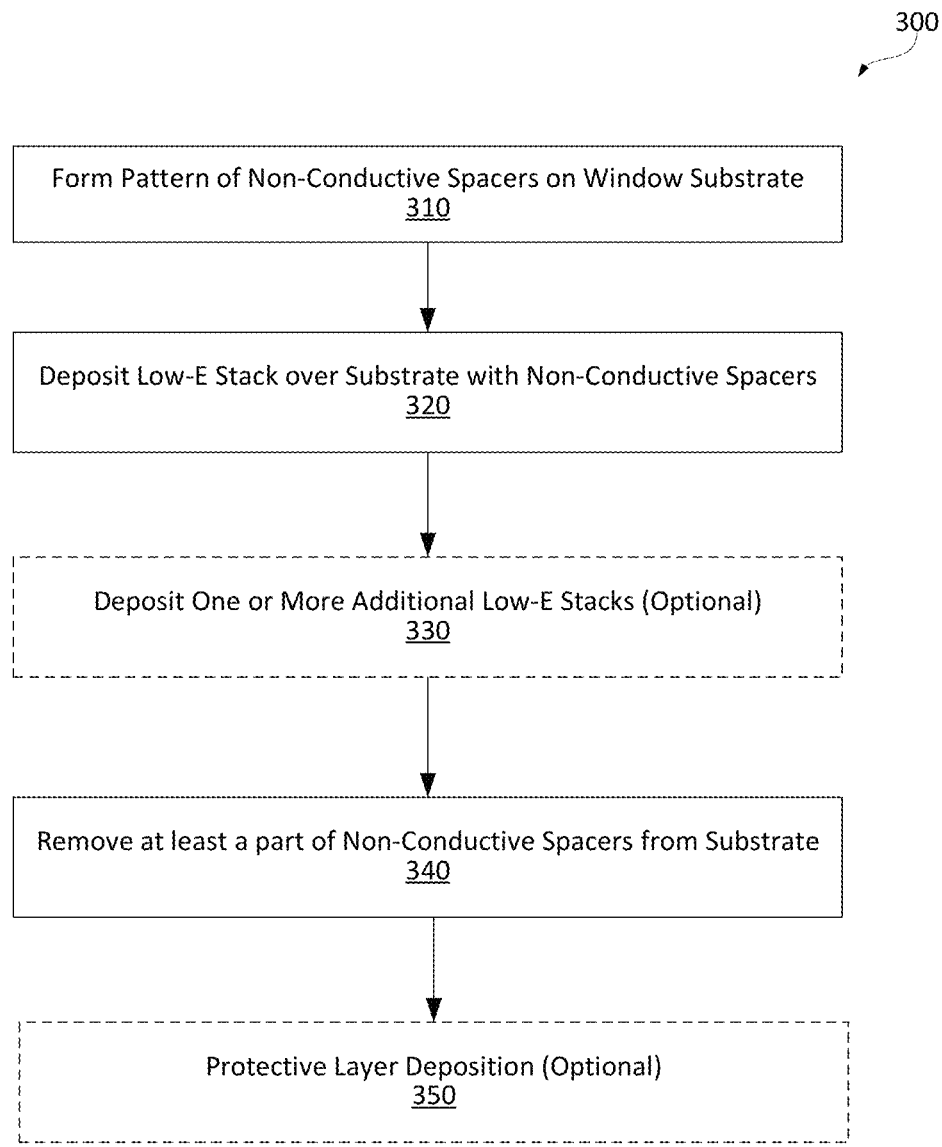
FIG. 3 is a process flowchart of a method for forming an energy-efficient signal-transparent window assembly, in accordance with some examples.

FIG. 3 is a process flowchart corresponding to method 300 of forming an energy-efficient signal-transparent window assembly 100, in accordance with some examples.

Figure 4A:
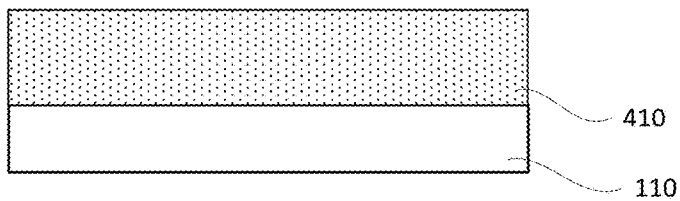
FIGS. 4A-4D are schematic cross-sectional views of various stages of the method while forming an energy-efficient signal-transparent window assembly, in accordance with some examples.
Figure 4B:
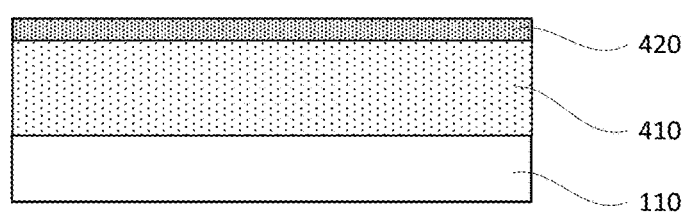
Figure 4C:
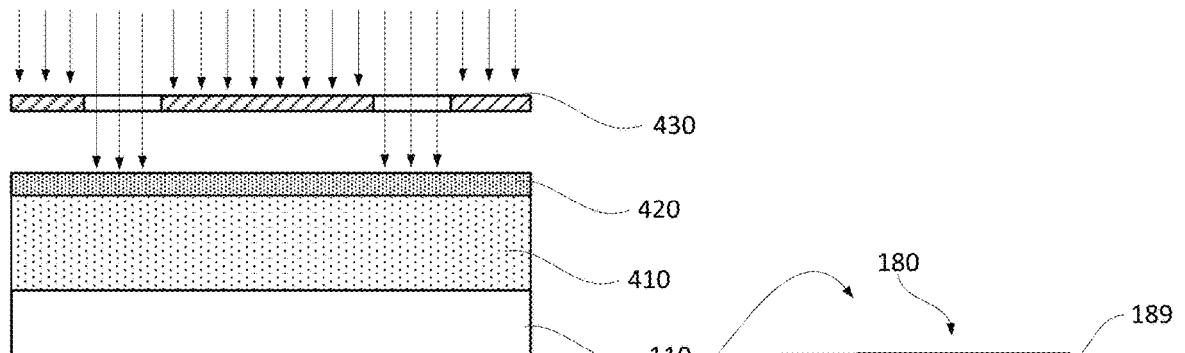
Figure 4D:
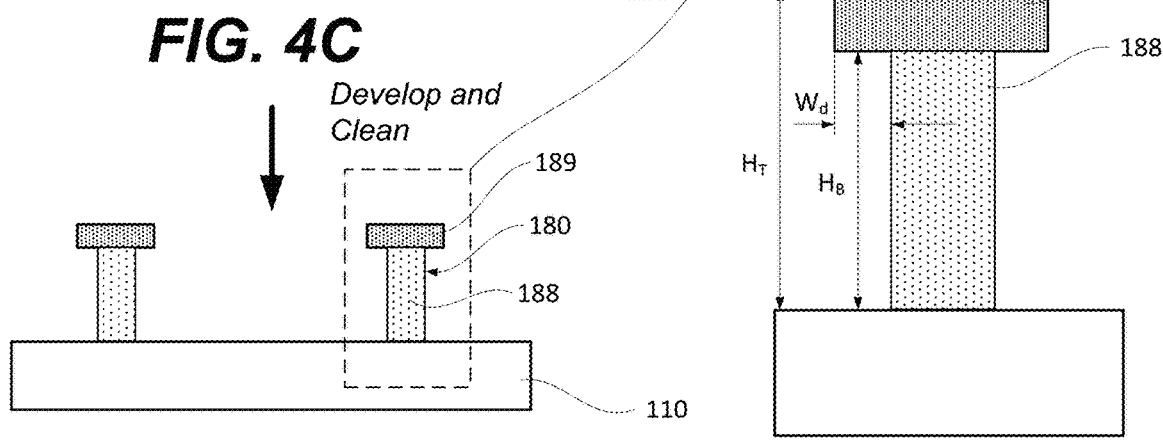

Method 300 may commence with forming (block 310) a pattern of spacers 180 on window substrate 110. This spacer pattern defines gap pattern 179, which is formed at a later operation when spacers 180 are removed. The pattern of spacers 180 may be formed, for example, using photolithography as, e.g., is schematically shown in FIGS. 4A-4D. Specifically, FIG. 4A illustrates a processing stage during which under-layer 410 is formed as a continuous coating on window substrate 110. Under-layer 410 is an optional component and, in some examples, under-layer 410 is not formed. FIG. 4B illustrates a processing stage during which photoresist layer 420 is formed over under-layer 410. In some examples (e.g., when under-layer 410 is not formed), photoresist layer 420 is directly on window substrate 110 (not shown). Photoresist layer 420 can be also formed as a continuous coating. Photoresist layer 420 may be formed from positive or negative photoresist, which corresponds to whether the exposed portion of photoresist layer 420 is soluble or insoluble to a photoresist developer. It should be noted that under-layer 410 is an optional layer. In some examples, photoresist layer 420 is formed directly on window substrate 110. FIG. 4C illustrates a processing stage during which photoresist layer 420 is exposed, e.g., using photolithographic mask 430. Finally, FIG. 4D illustrates a processing stage after etching and cleaning photoresist layer 420 and, if present, under-layer 410. Specifically, photoresist layer 420 is converted into spacer head 189, while under-layer 410 is converted into spacer base 188. The materials of photoresist layer 420 and under-layer 410 may be selected such that the etching rate of under-layer 410 is faster than that of photoresist layer 420. As a result, spacer base 188 has a smaller width than spacer head 189. In some examples, the width difference on each side ($W_d$ in FIG. 4D), which may be also referred to as an overhang, is between 200 nanometers and 1,500 nanometers or, more specifically, between 500 nanometers and 1,000 nanometers. In the same or other examples, the height of spacer base 188 ($H_B$ in FIG. 4D) is between 200 nanometers and 800 nanometers or, more specifically, between 300 nanometers and 600 nanometers. Furthermore, the total height of spacer 180 ($H_T$ in FIG. 4D) is between 300 nanometers and 1,500 nanometers or, more specifically, between 400 nanometers and 1,200 nanometers. Collectively, spacer head 189 and spacer base 188 form spacers 180.

While FIGS. 4A-4D illustrate an example in which two layers are used to form spacers 180, one having ordinary skill in the art would understand that a single layer or more than two layers may be used.

In some examples, one or more components of each spacer 180 (or the entire spacer 180) are formed from glass fiber and/or photoresist. In the same or other components, spacers 180 include any non-conductive materials, such as plastics, glass, polymers, resins, and the like. In some examples, the electrical conductivity of one or more materials forming spacers 180 is less than 1000 S/M (Siemens per meter) or, more specifically, less than 1 S/M. While spacers 180 are removed in later operations some residual parts of spacers 180 may remain in energy-efficient signal-transparent window assembly 100. If the remaining portion of spacers 180 is conductive, this portion may interfere with the penetration of wireless communication signals. For example, experimental results have shown that when a material with a conductivity of 3000 S/M was used for spacer 180, the penetration of wireless communication signals drops down substantially. In some examples, spacers 180 are transparent. For example, the extinction coefficient of spacers 180 material is at least smaller than 0.3 at the visible region at 550 nm, specifically, smaller than 0.1 at 550 nm. As noted above, a portion of spacers 180 may remain even after the spacer-removal operation. Experimental results have shown that using a material with a higher extinction coefficient (e.g., >0.3) resulted in more obviously noticeable (e.g., by human eyes) pattern lines than samples, in which the spacer materials had a lower extinction coefficient (e.g., <0.1).

Various methods of forming spacers 180 (e.g, according to a set pattern) protruding on a substrate and later removing these spacers 180 (e.g., to replace the glass fiber in the previous sample) are within the scope. These methods should be differentiated from laser ablation, which disturbs the substrate surface, therefore, weakening the window substrate. Specifically, the glass substrate surface loss along the pattern line could potentially reduce the glass substrate mechanical strength, and such weakened mechanical strength could potentially make the tempered glass window prone to brake, which is not acceptable for many applications (e.g., large glass windows).

In some examples, the complexity and cost of large size lithography equipment can be reduced by using a plurality of smaller sized modules (e.g., half size of the maximum substrate width in the production or smaller). The lithography pattern from different modules can be overlapped, and the light intensity non-uniformity crossing the whole lithography pattern area can be more than 20% calculated using the formula:

(MAX value−MIN value)/(2×AVERAGE value).

It should be noted that there is a tradeoff between the equipment complexity/cost and the uniformity of the light intensity in the lithography equipment. Described are novel methods of using multiple module exposures, with a tolerance of >20% of non-uniformity of light intensity, which can significantly reduce the lithography equipment cost.

In some example, multiple exposure light sources and optical apparatus are used (e.g., for cost reduction with light dose uniformity trade-off). For example, a tube-shaped lamp can replace a point lamp. In another example, a collimated ultraviolet light-emitting diode (UV-LED) array light source can be used with or without a photo-mask. The spectrum of the light can be in a wavelength 365-nanometer narrow band.

Integrating multiple modules in a lithography process may involve portions of energy-efficient signal-transparent window assembly 100 in which portions of low-E coating stack are not patterned. FIG. 2G, described above, illustrates patterned portions 102 positioned within non-patterned portions 104. The size and relative areas of these portions are selected based on the signal transmission requirements. In some examples, the average width of non-patterned portions 104 is smaller than 50 centimeters or, more specifically, smaller than 10 centimeters. In some examples, patterned portions 102 represent 10% or 50% of the substrate total area with only 10 DB or 3 DB additional losses on the signal transmission. The lithography pattern area larger than 90% substrate area only introduces less than 1 DB additional loss on the cellphone transmission in comparing that of the whole substrate patterned. In this example with some areas without patterns, the positive photoresist is used for the lithography. More specifically, areas without lithography patterned are cleaned out after the PR post-development process, to leave clean glass surfaces for the rest of the glass coating processes.

Figure 4E:
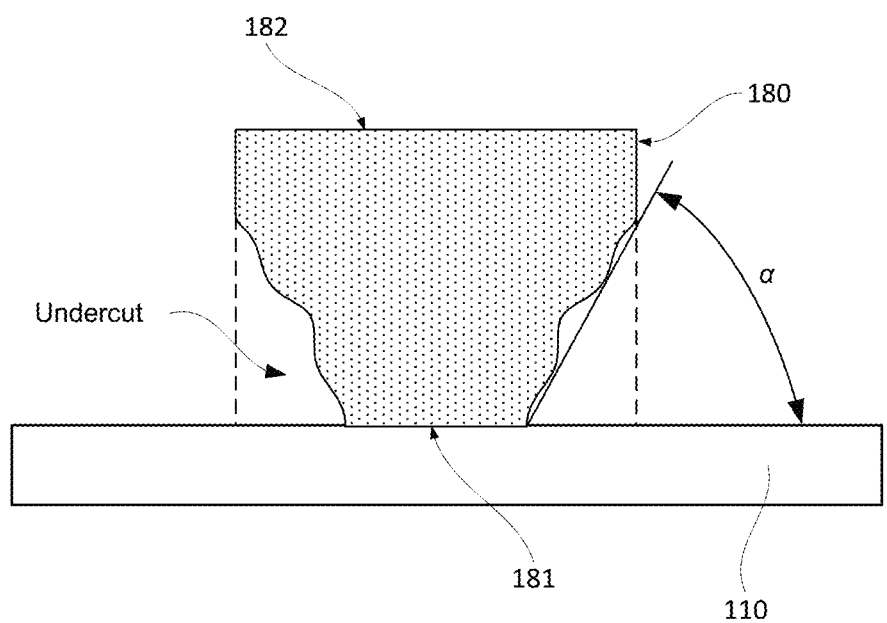
FIG. 4E is a schematic cross-sectional view of a spacer, showing an undercut, in accordance with some examples.

Furthermore, in some examples, spacers 180 have a tapered structure, defined by an undercut. One such example is schematically shown in FIG. 4E. As described above, the undercut helps with forming the separation between multiple disjoined structures 132 as further described below.

Specifically, each of spacers 180 has substrate-interfacing surface 181 and top surface 182, opposite of substrate-interfacing surface 181. The width of dielectric-interfacing surface 182 is larger than the width of top surface 181. In some examples, the difference between the width of top surface 182 and the width of substrate-interfacing surface is larger than 100 nm.

Overall, a pattern of spacers 180 may be formed using lithography, materials extrusion, nozzle jetting, or indirect deformation mechanically, such as using a mold, stamp, or by laser, UV source, or electron beam curing or other heating source hardening, or combined those techniques.

Figure 5A:
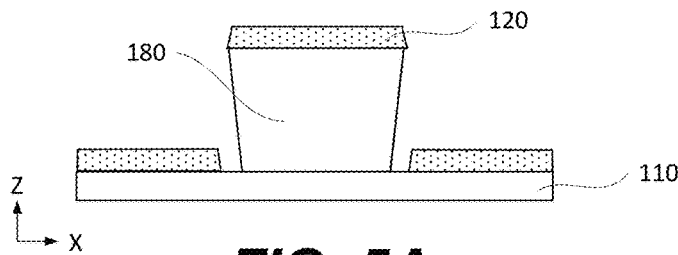
FIGS. 5A-5F are schematic views of additional stages of the method while forming an energy-efficient signal-transparent window assembly, in accordance with some examples.
Figure 5B:
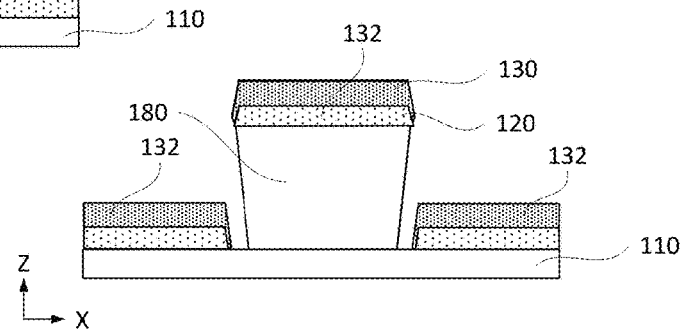
Figure 5C:
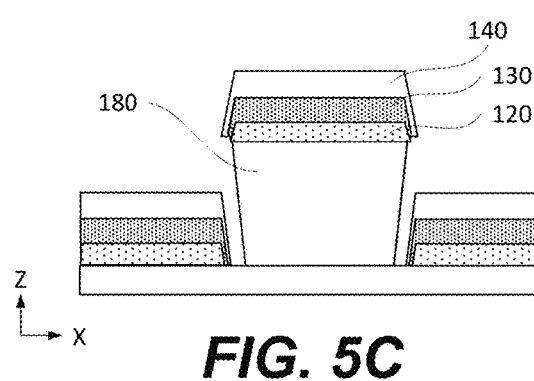
Figure 5D:
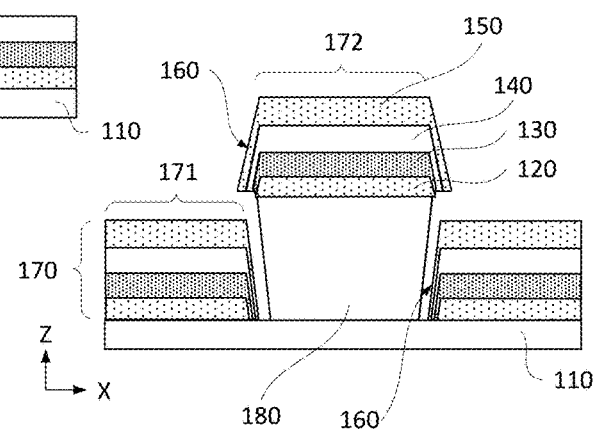

Returning to FIG. 3, method 300 proceeds with depositing (block 320) stack 170 over window substrate 110 and spacers 180. As described above, stack 170 comprises first dielectric layer 120, conductive layer 130, barrier layer 140, and second dielectric layer 150. Each layer is formed in a separate operation using, e.g., physical vapor deposition (PVD). FIGS. 5A-5D illustrate different stages during this stack forming operation. As shown in FIG. 5B, conductive layer 130 comprises multiple disjoined structures 132 defined by the pattern spacers 180. Disjoined structures 132 are formed due to spacers 180 protruding over the substrate. In some examples, conductive layer 130 is deposited using a high-pulsed plasma source with a power-on-cycle duration of less than 1 microsecond.

For the deposition of barrier layer 140 and second dielectric layer 150, various ways of controlling the deposition extension (of each layer forming a stack in) the undercut area of the photoresist (PR) is within the scope. For example, increasing the pressure of barrier layer 140 and second dielectric layer 150 in a sputtering deposition chamber makes deposition more isotropic or, in other words, less directional. Thus, there is more encroachment of sputtered materials in the PR undercut region. For example, when the pressure is lower during deposition of conductive layer 130 than that during the deposition of barrier layer 140 and also than that during the deposition of second dielectric layer 150, the edge sidewall of conductive layer 130 is covered by barrier layer 140 and second dielectric layer 150. The higher the pressure difference, the thicker sidewall protection is provided by each barrier layer 140 and second dielectric layer 150. For example, a low-pressure processing condition (such as 0.5~2 milli-Torr) is for deposition of conductive layer 130. At a such low-pressure level, a very limited amount of material will reach the undercut region. On the other hand, a high-pressure condition (such as 2-300 milli-Torr) is used for deposition of barrier layer 140 and second dielectric layer 150, providing more material into the undercut region. In some examples, additional and/or alternative techniques are used to enhance the directional deposition of conductive layer 130, such as including (1) ionized sputtering technique with the high ionization rate plasma from a special sputter source to enhance the sputtering directional feature, (2) the second bias source under the glass to enhance the directional sputter deposition, (3) collimators for sputtering, and/or (4) evaporation method can enhance the direction deposition.

Figure 6A:
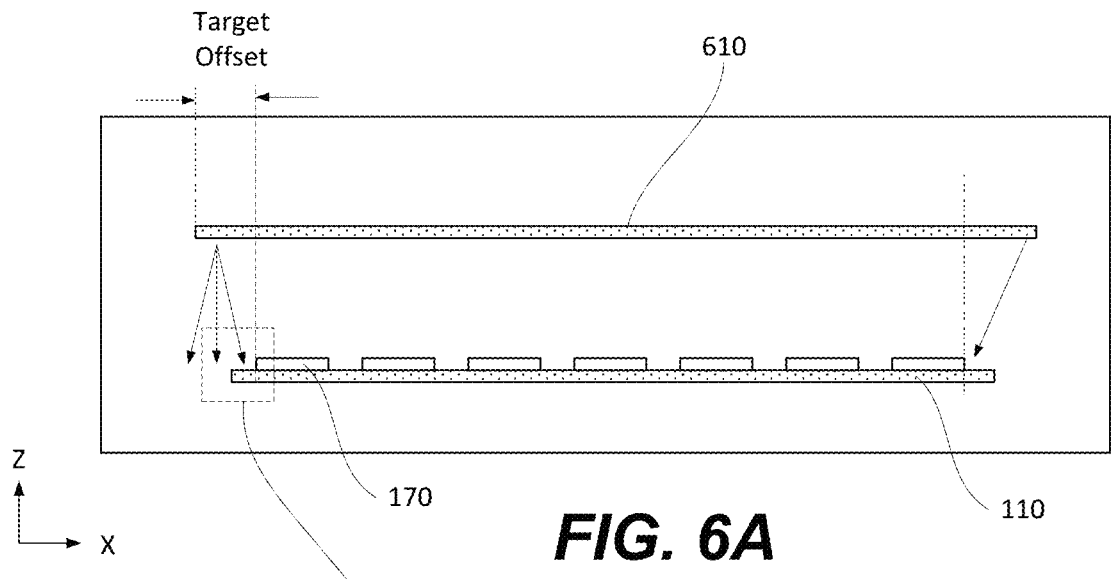
FIG. 6A illustrates an example of a sputtering apparatus illustrating relative positions of the sputtering target and edges of disjoined structures.
Figure 6B:
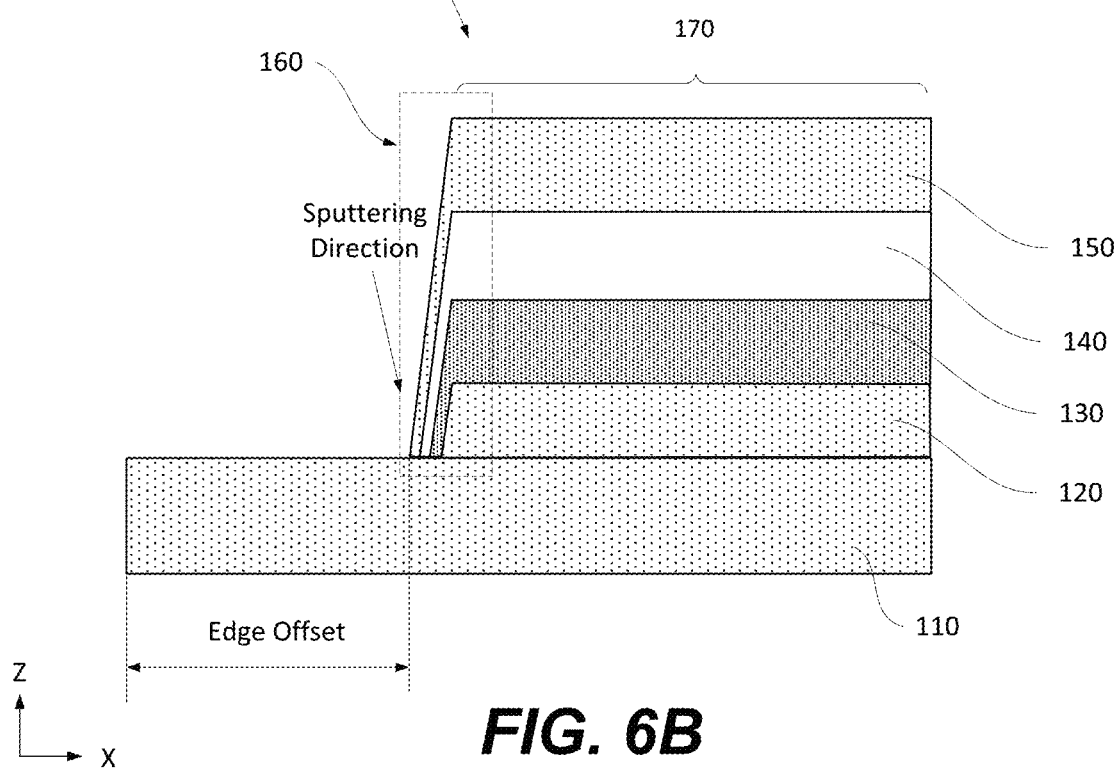
FIG. 6B is an expanded view of one disjoined structure showing the edge position relative to the material flux direction.

In some examples, stack 170 is positioned away from the edge of window substrate 110 at the side from the moving direction in the production line as shown in FIGS. 6A and 6B, e.g., spaced by at least 1 centimeter, such as 10 centimeters. Thus, the discontinued conductive layer at the pattern line away from the side edge direction can be protected during the isotropic deposition of barrier layer 140 and second dielectric layer 150 (e.g., from the edge of the sputtering targets 610).

For example, stacks 170 partially (e.g., 5%-95% based on the total substrate area) cover window substrate 110 as, e.g., is shown with patterned area 102 in FIG. 2G. Stacks 170 are located away from areas of window substrate 110 that are particularly challenging for processing, e.g., around the edges of window substrate 110. Furthermore, forming stacks 170 on window substrate 110 or, more specifically, forming stack gaps 175 can reduce the mechanical durability of the window-substrate portions positioned under and around stacks 170. Leaving portions of window substrate 110 free from stacks 170 and/or stack gaps 175 helps to maintain the mechanical durability of these portions, e.g., for robot picking or loading energy-efficient signal-transparent window assembly 100 during transportation. In some examples, portions of window substrate 110 free from stacks 170 and/or stack gaps 175, which may be referred to as unpatterned areas 104, extend at least 1 centimeter from the edge of window substrate 110 or, more specifically, at least 2 centimeters, e.g., as schematically shown in FIGS. 6A and 6B. In some examples, some unpatterned area 104 on window substrate 110 is located away from the edges (e.g., in the center region of window substrate 110), which can be used for robot loading area.

In some examples, the sputtering direction during the conductive layer deposition is controlled (e.g. improved) through a high-density plasma. For example, a high frequency (>10 k Hz) power source may be used to generate plasma or, more specifically, a 13.56-Mhz power source. It should be noted that such high-frequency power sources have not been adopted for conducting metal layer deposition on glass substrates in low-E production lines. The main reason is that a DC (direct current) power source and a low-frequency AC (<10 kHz) power source provide high production efficiency and low manufacturing cost. However, a high-frequency power source can generate highly ionized (ionization rate >50%) plasma. In some examples, the ionization rate is at or greater than 90%. In such a case, the plasma potential could be 10 Volts or more, and a self-bias phenomenon occurs near the glass surface. This phenomenon guides the ion deposition direction at a substantially normal angle, referring to the incidence angle deposition relative to the glass surface.

In some examples, sputtering target 610 is wider than the area in which stacks 170 are formed on window substrate 110 as, e.g., is schematically shown in FIGS. 6A and 6B. This feature may be referred to as a target offset and ensures that the outermost edges of the outermost stacks 170 receive materials from sputtering target 610 thereby assuring that sidewalls 160 are formed.

In some examples, the sputtering direction is controlled (e.g., improved) using a high-density plasma, generated by a high-power impulse magnetron sputtering (HIPIMS) method. This method can generate plasma with an ionization rate of more than 50% and even fully ionized plasma. Specifically, this method may be used for the directional deposition of conducting layer 130. Other layers of the same assembly may be deposited using other deposition methods (other than highly ionized plasma). These other methods are less directional and cover the sidewalls of conducting layer 130. The pulse duration length of the HIPIMS power source could be smaller than 1000 microseconds, more specifically 100 or 10 microseconds or 1 microsecond. The duty cycle factor is less than 10%, more specifically 1% or less. The duty cycle factor is defined as the ratio of time that the circuit power is ON compared to the time the circuit power is OFF.

The conducting layer sidewall protection can also be achieved by a CVD or ALD or PECVD deposition of barrier layer 140, such as Ni, Ti, Al, Y, Cr, or other protection metal materials or their alloys with one or more of those elements. CVD stands for chemical vapor deposition, PECVD stands for plasma-enhanced chemical vapor deposition, and ALD stands for atomic layer deposition. By CVD, PECVD, or ALD method, the sidewall thickness of barrier layer 140 can be easily achieved at >1 nm, or at least >0.3 nm.

The sidewall protection of conductive layer 130 (with barrier layer 140 and second dielectric layer 150) has demonstrated excellent environmental and thermal durability. The environmental durability was tested by dipping a sample for one hour into a boiling water container. The thermal durability was tested using 650° C. baking for 8 minutes for 3 mm glass coating, or 650° C. baking for 7 minutes for 0.5 mm glass coating. There were no noticeable defects under the microscope inspection. These sidewall conductive layer protection designs and methods apply to any number of layers in a stack.

In some examples, depositing stack 170 also comprises forming two adjacent sidewalls 160 around each of spacers 180 as well as on edges of stack 170 positioned over each spacer 180. Various ways of controlling the deposition extension (of each layer forming a stack in) the undercut area of the photoresist (PR) are within the scope. For example, increasing the pressure in a sputtering deposition chamber makes deposition more isotropic or, in other words, less directional. Thus, there is more encroachment of sputtered materials in the PR undercut region. For example, when the pressure is lower during deposition of conductive layer 130 than that during the deposition of barrier layer 140 and also than that during the deposition of second dielectric layer 150, the edge sidewall of conductive layer 130 is covered by barrier layer 140 and second dielectric layer 150. The higher the pressure difference, the thicker sidewall protection is provided by each barrier layer 140 and second dielectric layer 150. For example, a low-pressure processing condition (such as 0.5~2 milliTorr) is for deposition of conductive layer 130. At a such low-pressure level, a very limited amount of material will reach the undercut region. On the other hand, a high-pressure condition (such as 3-300 milliTorr) is used for deposition of barrier layer 140 and second dielectric layer 150, providing more material into the undercut region. In some examples, additional and/or alternative techniques are used to enhance the directional deposition of conductive layer 130. One example is an ionized sputtering technique with a high ionization rate plasma from a special sputter source to enhance the sputtering directional feature. Another example is using a second bias source under the glass to enhance the directional sputter deposition. Additional examples include collimators for sputtering, and/or evaporation method can enhance the direction deposition.

The sidewall protection of conductive layer 130 (with a barrier layer and a second dielectric layer) has demonstrated excellent environmental and thermal durability. The environmental durability was tested by dipping a sample for one hour into a boiling water container. The thermal durability was tested using 650° C. baking for 8 minutes. There were no noticeable defects under the microscope inspection.

These sidewall conductive layer protection designs and methods apply to any stacks and any number of layers in each stack. Both highly non-directional processes (e.g., high-pressure processes) and directional processes (e.g., low-pressure processes) are within the scope.

One issue of the undercut profile of single-layer photoresist is influenced by the non-uniformity of the light intensity with lithography equipment. There is a bi-layer method that minimizes this influence, where the bottom layer material having a dissolution rate in the developer much different from that of the photoresist above the bottom materials, so the dissolution rate is more dependent on time and other processing parameters instead of exposing light intensity. Thus, the undercut amount is more dependent on the photoresist materials and less dependent on the light intensity. As such, a large non-uniformity of exposing light intensity has a very small influence on the undercut amount, so that it can be acceptable in this application.

In some examples, method 300 comprises depositing (block 330) one or more additional stacks over stack 170, which is disposed over window substrate 110 and spacers 180.

In some examples, method 300 comprises removing (block 340) spacers 180 from energy-efficient signal-transparent window assembly 100. For example, energy-efficient signal-transparent window assembly 100 may be tempered (e.g., subjected to high temperatures) turning spacers 180 into volatile species, which are removed from the environment with oxygen, such as air. The spacer materials can also be removed or partially removed by using a plasma process using a gas containing oxygen and/or nitrogen gas. Non-conductive spacers 180 can comprise materials that could be burned out completely in an oxygen-containing environment (e.g., air) without any residues. In some examples, spacers 180 are consist of one or more of the following five elements: carbon (C), hydrogen (H), oxygen (O), nitrogen (N), and sulfur (S). The absence of other elements from the spacer composition ensures the residual-free removal of spacers 180.

Figure 5E:
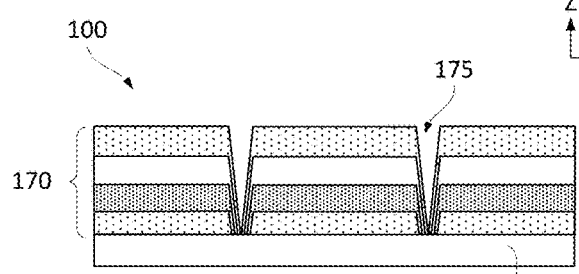

It should be noted that stacks 170 positioned over spacers 180, which may be referred to as secondary stacks 172, are effectively lowered onto window substrate 110 as, e.g., is schematically shown in FIG. 5E.

Figure 5F:
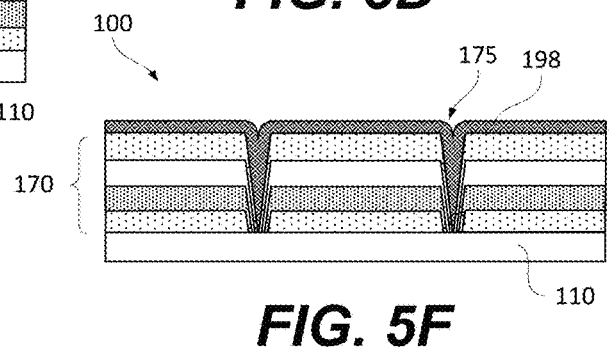

In some examples, method 300 comprises forming (block 350) protective layer 198 over stacks 170 as, e.g., is schematically shown in FIG. 5F.

Experimental Results

Various tests have been conducted to evaluate the performance of energy-efficient signal-transparent window assemblies prepared in accordance with various examples listed above. Uncoated glass samples and conventional low-E coating samples were used as references. The results are presented in FIG. 7.

Specifically, all samples used a glass substrate that was 0.5 millimeters thick. Furthermore, conventional low-E coating samples and energy-efficient signal-transparent window assemblies with patterned conductive layers utilized the same low-E stack, i.e., a first dielectric layer formed from ZnSnO, a conductive layer formed from a silver, a barrier layer formed from NiCr alloy, and a second dielectric layer formed from ZnSnO. The overall coating size was 55 millimeters×55 millimeters. The pitch size of the pattern was 0.5 millimeters, the pattern line width is 5 micrometers.

IR blocking characteristics of various test samples have been demonstrated using an IR lamp and a light-mill radiometer. Specifically, when IR radiation is present, the vanes of the radiometer spin. Without IR radiation, the vanes do not spin. Sample 1 described above showed exceptional IR blocking characteristics. When Sample 1 was inserted between the IR lamp and the radiometer, the vanes of the radiometer stopped spinning completely, which demonstrates effective IR blocking. The emissivity was measured as 0.06 in this case.

Figure 7:
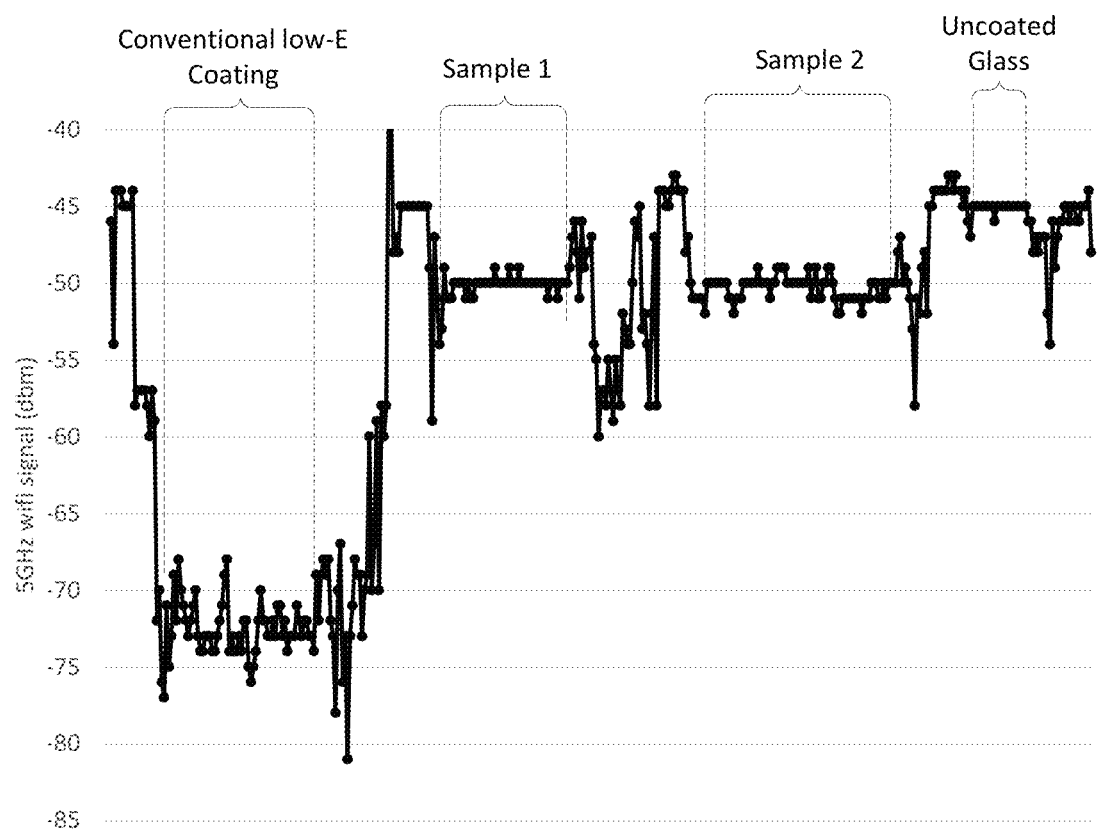
FIG. 7 illustrates test results of energy-efficient signal-transparent window assemblies.

Referring to FIG. 7, the electromagnetic wave penetration of wireless signal (e.g., cellular phone signal) was tested using the following method. A heavy-duty 16 GA welded steel box leaves a window open with a size of 50 millimeters by 50 millimeters. The box simulates a building, which electromagnetic waves cannot penetrate. Only the window in the box allows electromagnetic wave penetration. The signal source, used for this experiment, was a router with 5 GHz (wavelengths of 60 millimeters). A cell-phone, APPLE® IPHONE® 7, was used as a signal receiver. The phone was equipped with a software application "AirPort Utility" to measure the Wi-Fi signal intensity, recorded the Wi-Fi signal data every 5 seconds, as received by the phone. The phone was placed inside the box facing the window. A reference test with a blank substrate glass on the window of the box has shown the signal strength of around −45 DBm, which is a reference baseline for the Wi-Fi signal in the box. A low-E coated glass was tested on the window as another reference, and the signal strength in the box dropped to around −75 DBm to −72 DBm. As such, two different glass samples have shown about nearly 30 DBm difference or around 1000 time signal intensity reduction due to the low-E coating on the glass. Then, two invention prototype samples with the pattern on low-E coated glass was tested on the window, and the signal strength in the box only slightly drop, as around −50 DBm, or the difference from the pure glass only around 5 DBm. These results clearly demonstrated that the prototype sample of patterned low-E coating glass, significantly improve the Wi-Fi signal transmission.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered illustrative and not restrictive.

What is claimed is:

1. An energy-efficient signal-transparent window assembly comprising:
    a window substrate; and
    a stack, the stack comprising:
        a first dielectric layer disposed over the window substrate;
        a conductive layer disposed over the first dielectric layer such that the first dielectric layer is disposed between the conductive layer and the window substrate, wherein the conductive layer is formed by multiple disjoined structures separated by gaps;
a barrier layer disposed over the conductive layer such that the conductive layer is disposed between the first dielectric layer and the barrier layer; and
a second dielectric layer disposed over the barrier layer such that the barrier layer is disposed between the second dielectric layer and the conductive layer, wherein:
the first dielectric layer, the conductive layer, the barrier layer, and second dielectric layer form a plurality of primary stacks and a plurality of secondary stacks over at least a portion of the window substrate,
the plurality of secondary stacks forms a pattern, defined by pattern lines extending between each adjacent pair of the plurality of primary stacks such that each of the pattern lines has a width smaller than 100 micrometers, and
each of the plurality of primary stacks has an enclosed shape, defined by the pattern, with a dimension smaller than 10 millimeters in any direction parallel to the window substrate.

2. The energy-efficient signal-transparent window assembly of claim 1, wherein each of the plurality of secondary stacks is spaced away or partially spaced away from the window substrate by one or more of residual spacers and air.

3. The energy-efficient signal-transparent window assembly of claim 1, wherein each of the plurality of secondary stacks is spaced away from the window substrate by less than 200 nanometers.

4. The energy-efficient signal-transparent window assembly of claim 1, wherein, on average, the plurality of secondary stacks protrudes further away from the window substrate more than the plurality of primary stacks.

5. The energy-efficient signal-transparent window assembly of claim 1, wherein each of the plurality of secondary stacks directly interfaces the window substrate.

6. The energy-efficient signal-transparent window assembly of claim 1, wherein the first dielectric layer, the conductive layer, the barrier layer, and the second dielectric layer are disjoined among the plurality of primary stacks and the plurality of secondary stacks.

7. The energy-efficient signal-transparent window assembly of claim 1, wherein the width of each stack in the plurality of secondary stacks is between 1 micrometer and 20 micrometers.

8. The energy-efficient signal-transparent window assembly of claim 1, further comprising:
an additional first dielectric layer disposed over the stack,
an additional conductive layer disposed over the additional first dielectric layer and formed by additional multiple disjoined structures separated by additional gaps,
an additional barrier layer disposed over the additional conductive layer; and
an additional second dielectric layer disposed over the additional barrier layer.

9. The energy-efficient signal-transparent window assembly of claim 1, further comprising a protective layer disposed over the stack, comprising a transparent material with an extinction coefficient of less than 0.1 at 550 nanometers.

10. The energy-efficient signal-transparent window assembly of claim 9, wherein the protective layer has a conductivity of less than 1 S/M.

11. The energy-efficient signal-transparent window assembly of claim 9, wherein the protective layer is configured to bond to an additional window substrate.

12. The energy-efficient signal-transparent window assembly of claim 1, wherein the pattern lines comprise pattern line segments, more than half of which have a curvature of more than 1 m$^{-1}$.

13. The energy-efficient signal-transparent window assembly of claim 1, wherein an area of the enclosed shape each of the plurality of primary stacks, defined by the pattern, is varied throughout the pattern such that a ratio of the area of 25% largest ones to a 25% smallest ones is between 1.01 to 4.0.

14. The energy-efficient signal-transparent window assembly of claim 13, wherein the enclosed shape is a polygon.

15. The energy-efficient signal-transparent window assembly of claim 14, wherein the polygon is a hexagon.

16. A method of forming an energy-efficient signal-transparent window assembly, the method comprising:
forming a pattern of spacers on a window substrate;
depositing a stack on the window substrate and the spacers, the stack comprising
a first dielectric layer disposed over the window substrate,
a conductive layer disposed over the first dielectric layer such that the first dielectric layer is disposed between the conductive layer and the window substrate, wherein the conductive layer is formed by multiple disjoined structures separated by gaps,
a barrier layer disposed over the conductive layer such that the conductive layer is disposed between the first dielectric layer and the barrier layer, and
a second dielectric layer disposed over the barrier layer such that the barrier layer is disposed between the second dielectric layer and the conductive layer, wherein:
the first dielectric layer, the conductive layer, the barrier layer, and second dielectric layer form a plurality of primary stacks and a plurality of secondary stacks over at least a portion of the window substrate,
the plurality of secondary stacks forms a pattern, defined by pattern lines extending between each adjacent pair of the plurality of primary stacks such that each of the pattern lines has a width smaller than 100 micrometers, and
each of the plurality of primary stacks has an enclosed shape, defined by the pattern, with a dimension smaller than 10 millimeters in any direction parallel to the window substrate;
wherein the multiple disjoined structures are defined by the pattern of the spacers; and
removing the spacers such that portions of the stack, previously positioned over the spacers, are disposed on the window substrate while maintaining the conductive layer as the multiple disjoined structures.

17. The method of claim 16, wherein the conductive layer is deposited using a high-pulsed plasma source with a power-on-cycle duration of less than 1 microsecond.

18. The method of claim 16, wherein the spacers have a tapered shape such that a substrate-interfacing surface of each of the spacers is smaller than a top surface, opposite of the substrate-interfacing surface.

19. The method of claim 16, wherein the substrate-interfacing surface is narrower than the top surface by between 200 nanometers and 1500 nanometers.

20. The method of claim 16, wherein the spacers have a height less of than 1500 nanometers.

* * * * *